United States Patent [19]

Hashimura et al.

[11] Patent Number: 5,533,446
[45] Date of Patent: Jul. 9, 1996

[54] THIN-FILM FORMING APPARATUS AND THIN-FILM FORMING METHOD

[75] Inventors: Yasuhiro Hashimura; Satoshi Noguchi; Kenichi Masaki; Takahiro Akai, all of Kyoto, Japan

[73] Assignee: Nissha Printing Co., Ltd., Kyoto, Japan

Related U.S. Application Data

[63] Continuation-in-part of PCT/JP94/00630, Apr. 15, 1994.

[21] Appl. No.: 282,989

[22] Filed: Aug. 30, 1994

[30] Foreign Application Priority Data

Apr. 16, 1993 [JP] Japan .................. 5-113809
Apr. 16, 1993 [JP] Japan .................. 5-113810
Apr. 16, 1993 [JP] Japan .................. 5-113811

[51] Int. Cl.$^6$ .................. B41F 27/06; B41F 27/12; B41F 3/38
[52] U.S. Cl. .................. 101/150; 101/169; 101/170; 101/477
[58] Field of Search .................. 101/150–153, 101/216, 477, 157, 169, 415.1, 158, 170

[56] References Cited

U.S. PATENT DOCUMENTS 4,727,807  3/1988  Suzuki et al. .................. 101/415.1
5,191,836  3/1993  Weis .................. 101/219

FOREIGN PATENT DOCUMENTS 62-74654    4/1987   Japan .
63-295262  12/1988   Japan .
5-31882     2/1993   Japan .
5-82545    11/1993   Japan .

*Primary Examiner*—J. Reed Fisher
*Attorney, Agent, or Firm*—Wenderoth, Lind & Ponack

[57] ABSTRACT

A thin-film forming apparatus which includes a printing device having an intaglio roll having a plurality of ink cells, an ink supply which includes a doctor blade and which fills ink into the ink cells, a printing roll with an elastic plate, to which the ink of the intaglio roll is transferred wound round the barrel surface thereof, and a printing table which fixes a to-be-printed material to which the ink of the printing roll is transferred, wherein the apparatus includes a articulated robot, and an implementation device for the printing preparatory works which is mounted to the arm of the articulated robot and which performs at least one operation among the mounting/dismounting operation of the elastic plate to/from the printing roll, the operation to wipe and/or dry the ink on the barrel surface of the intaglio roll, and the operation to wipe and/or dry the ink on the doctor blade.

21 Claims, 20 Drawing Sheets

THIN-FILM FORMING APPARATUS AND THIN-FILM FORMING METHOD

CROSS REFERENCE TO RELATED APPLICATIONS

This is a continuation-in-part of International Application PCT/JP94/00630 filed Apr. 15, 1994.

TECHNICAL FIELD

The present invention relates to a thin-film forming apparatus, which includes, as an apparatus for forming a macromolecular thin-film pattern used for the electronic parts such as a liquid crystal orientation film, for example, an intaglio roll having a plurality of ink cells; an ink supply means which fills ink into the ink cells; a printing roll having an elastic plate, to which the ink of the intaglio roll is transferred, on the barrel; a printing table which fixes the to-be-printed material, to which the ink of the printing roll is transferred; a doctor blade to ensure the filling of the ink into the ink cells of the intaglio roll; and a robot which operates for the printing roll and the intaglio roll, and a thin-film forming method which uses the thin-film forming apparatus to form a thin-film. More particularly, the present invention relates to a thin-film forming apparatus and a thin-film forming method which can carry out at least one of the follows:

(i) to form a thin-film, after the elastic plate is automatically mounted on the barrel of the printing roll, while stretching the elastic plate so that a predetermined tension is applied uniformly on the whole elastic plate;

(ii) to form a thin-film after the barrel surface of the intaglio roll is automatically and uniformly wiped out and/or dried by pressing a wiper automatically against the intaglio roll with a predetermined contact pressure, while the wiping out and/or the drying of the barrel surface (including the ink cells) of the intaglio roll is simple; and (iii) to form a thin-film, after the doctor blade is automatically held by the wiper with a predetermined holding pressure and the doctor blade is automatically and uniformly wiped out and/or dried, while the wiping out and/or the drying of the doctor blade is simple.

BACKGROUND ART

In the conventional thin-film forming apparatus, the printing preparatory works, such as mounting/dismounting of the elastic plate, and wiping out of the intaglio roll and the doctor blade, are carried out by the operator by hand, before the printing operation. These works will be concretely described below.

In the thin-film forming apparatus shown in FIG. 31, in order to mount the elastic plate to the barrel of the printing roll, marks for positioning provided in plural places of the elastic plate and reference marks provided in plural places of the barrel of the printing roll are first positioned by the operator's hand(s) and the eyes of the operator, and the elastic plate is stretched by the operator's hand(s) to be wound around the barrel of the printing roll. Afterwards, elastic plate holders which are mounted on both ends of the elastic plate are fixed by the operator's hand(s), by hooking them to chuck means mounted on the barrel of the printing roll.

Then, the ink is filled into the plurality of ink cells of the intaglio roll by an ink supply means, transferred from the intaglio roll to the elastic plate of the printing roll, and transferred from the printing roll to the to-be-printed material which is fixed on the printing table to carry out the printing.

Furthermore, after the printing is completed, in order to dismount the elastic plate from the barrel of the printing roll, the elastic plate holders mounted on both ends of the elastic plate are dismounted by the operator's hand(s) from the chuck means on the barrel of the printing roll.

Furthermore, in the conventional thin-film forming apparatus, alloy the ink in the ink cells of the intaglio roll is not always transferred to the printing roll, and a part of the ink remains in the ink cells of the intaglio roll. If the residual ink is left as is, the residual ink will dry or stiffen to form an ink solid, and the ink solid adheres to the inner part of the ink cells. If the intaglio roll is used as is, the adhered ink is redissolved in new ink, or the ink solid drops out to be mixed in the new ink supplied to the intaglio roll, thereby resulting in deteriorated ink being used for the printing. Furthermore, since the ink adhered to the ink cells decreases the volume of the ink cells, the transferred amount of the ink to the printing roll is decreased by that amount.

Therefore, conventionally, the residual ink in the ink cells of the intaglio roll is wiped out, which is done all by the operator's hand(s). Namely, a wiper is first saturated with solvent which dissolves the ink, and pressed by the operator's hand against the barrel surface of the intaglio roll with a predetermined contact pressure, and is moved along the axial direction of the intaglio roll, while rotating the intaglio roll in the state that the wiper is pressed against it.

Then, in order to remove the solvent which is left on the barrel surface of the intaglio roll, the intaglio roll is dried. Namely, a gas ejecting means which ejects gas for drying the intaglio roll is first placed by the operator's hand(s) so that there is a predetermined distance between the gas ejecting means and the barrel surface of the intaglio roll, and while ejecting the gas to the barrel surface of the rotating intaglio roll, the gas ejecting means is moved by the operator's hand(s) along the axial direction of the intaglio roll while rotating the intaglio roll.

Then, the ink is filled into the plurality of ink cells of the intaglio roll by the ink supply means, transferred from the intaglio roll to the elastic plate of the printing roll, and transferred from the printing roll to the to-be-printed material which is fixed on the printing table to carry out the printing.

Furthermore, the doctor blade is a plate-shaped body, and mounted to the doctor blade-supporting rod (see FIG. 27). Since the doctor blade has a function to scrape off ink on the barrel surface of the rotating intaglio roll, and to ensure and measure the filling of the ink into the ink cells of the intaglio roll, if the doctor blade to which the ink has adhered is left as is, the adhered ink will dry or stiffen to become an ink solid, and the ink solid adheres to the doctor blade. If the ink-adhered doctor blade is used, the adhered ink is redissolved in new ink, or the ink solid drops out to be mixed in the new ink supplied to the intaglio roll, thereby resulting in deteriorated ink being used for the printing. Furthermore, since the tip of the doctor blade becomes uneven due to the adhered ink, the scraping-off of unnecessary ink cannot be done evenly, and it becomes difficult to secure the filling into the all of ink cells of the intaglio roll and measuring the ink amount.

Therefore, conventionally, the ink adhered to the doctor blade is wiped out, which is done all by the operator's hand(s). Namely, the wiper, first saturated with solvent, is held in the operator's hand(s) to hold the doctor blade between them with a predetermined contact pressure, and are moved along the longitudinal direction of the doctor blade such that the doctor blade is put therebetween. Then, in order to remove the solvent which stays behind on the doctor blade, the doctor blade is dried by the operator's hand(s). Namely, a gas ejecting means which ejects gas for drying the doctor blade is placed by the operator's hand(s) so that there is a predetermined distance between the gas ejecting means and the doctor blade, and while ejecting the gas to the doctor blade, the gas ejecting means is moved by the operator's hand(s) along the longitudinal direction of the doctor blade.

Then, the ink is filled into the plurality of ink cells of the intaglio roll by the ink supply means, transferred from the intaglio roll to the elastic plate of the printing roll, and transferred from the printing roll to the to-be-printed material which is fixed on the printing table to carry out the printing.

However, there are some problems described below in the conventional thin-film forming apparatus:

(1) Since all the works, such as positioning of the elastic plate and the barrel of the printing roll, stretching of the elastic plate, hooking to the chuck means, mounting/dismounting of the elastic plate to the barrel of the printing roll, wiping and drying of the intaglio roll, and wiping and drying of the doctor blade are performed by the operator's hand(s), and thereafter, the printing is carried out, the efficiency to form the thin-film is very low.

(2) Since lots of people go in and out in order to mount the elastic plate to the barrel of the printing roll, to wipe out the intaglio roll, and to wipe out the doctor blade, lots of dust is raised from the people themselves, the clothing thereof, and the grounds, and thus the cleanness in the surroundings is deteriorated. Also, since the elastic plate is held by the operator's hand(s), there is a case where the elastic plate is held by dirty oily hands. Thus, dust, dirt and oils adhere to the elastic plate to make it dirty.

When ink is transferred from the intaglio roll to such an elastic plate, dust, dirt and oils are mixed in the ink, and thus, the ink tends to have foreign substances mixed therein or is deteriorated. Accordingly, when a macromolecular thin-film such as a liquid crystal orientation film or the like is formed by using such ink, there are caused such problems are caused in that the functions of the thin-film are deteriorated because the insulating property is deteriorated, unevenness in the film thickness or in the orientation occurs, and a part of the film is broken.

(3) Since the elastic plate is wound around the barrel of the printing roll, while stretching it by the operator's hand(s), it is difficult to make the tension have a predetermined magnitude and a predetermined direction as applied along the whole width of the elastic plate, when the elastic plate is wound around the barrel of the printing roll. If much attention is not given to carry out the work, the elastic plate might be sometimes wound around the barrel of the printing roll such that an excessive tension or a slackening tension is applied to the elastic plate to be wound which cannot be corrected. As a result, there might be a case where the elastic plate is mounted to the barrel of the printing roll such that an excessive tension is applied to the elastic plate or such that the elastic plate has wrinkles or waves.

When the intaglio roll is brought into contact with the elastic plate in such a state, the contact pressure between the intaglio roll and the elastic plate and the contact pressure between the elastic plate and the to-be-printed material become uneven, and there are places having uneven transfer volume in the to-be-printed material, and a thin-film having an uniform film thickness cannot be formed on the to-be-printed material. When an attempt is made to mount an elastic plate on the printing roll by the operator's hand(s) so as not to cause these defects, even an expert needs a lot of time, and the efficiency to form a thin-film is decreased.

(4) Since the intaglio roll is wiped out by pressing a wiper held by the operator's hand(s) against the intaglio roll, it is quite difficult to press the wiper against the intaglio roll with a predetermined contact pressure and to maintain the predetermined contact pressure, while moving the wiper in the axial direction of the intaglio roll, and the contact pressure becomes too strong or too weak. As a result, there are places where it is sufficiently wiped out and where it is insufficiently wiped out and the residual ink adhered to the ink cells cannot be removed sufficiently. It is also impossible to uniformly wipe out the barrel surface of the intaglio roll.

When ink is supplied to the intaglio roll which has not been sufficiently wiped out, the ink adhered to the intaglio roll is mixed with ink newly supplied to the intaglio roll, and thus a different kind of ink is mixed every time when the ink is exchanged to another kind. Also, since the adhered ink is left in the ink cells without being transferred to the printing roll, the amount of ink transferred to the printing roll becomes less by that amount, and thus, a thin-film having a sufficient film thickness cannot be formed on the to-be-printed material.

Furthermore, if the ink is not wiped out sufficiently and uniformly, some ink cells have enough ink and some have less ink, and thus the amount of ink transferred to the printing roll becomes uneven, and the film thickness becomes uneven. Therefore, for example, when a macromolecular thin-film pattern such as a liquid crystal orientation film is formed, problems are caused in that the film thickness becomes uneven to cause unevenness in the display, and the functions of the thin-film are deteriorated.

(5) Since the drying of the intaglio roll is carried out by holding the gas ejecting means by the operator's hand(s), it is quite difficult to maintain a predetermined distance between the gas ejecting means and the barrel surface of the intaglio roll, while moving the gas ejecting means in the axial direction of the intaglio roll, and the distance tends to become too large or too small. As a result, some places are dried sufficiently and some are not, and the barrel surface of the intaglio roll cannot be dried uniformly.

When ink is supplied to the intaglio roll which has not been uniformly dried, the solvent used for wiping is mixed in new ink supplied to the intaglio roll as an impurity. Therefore, in the case where a macromolecular thin-film pattern, such as a liquid crystal orientation film, is formed by using such ink, problems are caused in that the insulating property is deteriorated and the functions of the thin-film are deteriorated due to the unevenness in the film thickness and in the orientation.

(6) When a doctor blade made of plastic is used, if a hard substance such as a nail of a finger hits the tip of the doctor blade during the wiping operation by the operator's hand(s), the tip of the doctor blade becomes uneven so that the scraping-off of unnecessary ink is unevenly done, and it becomes difficult to secure the filling and measuring into all the ink cells of the intaglio roll.

(7) Since the wiping is carried out by holding a doctor blade by the wiper held by the operator's hand(s), it is quite difficult to press the wiper against the tip of the doctor blade with a predetermined contact pressure and to maintain the predetermined contact pressure while moving the wiper in the longitudinal direction of the doctor blade, and the contact pressure becomes too strong or too weak. As a result, the tip of the doctor blade and the wiper part from each other so that the tip of the doctor blade cannot be wiped out, or the tip of the doctor blade and the wiper contact each other too strongly to break the wiper, and thus the workability is deteriorated. Also, it is quite dangerous in that a hand of the operator may rub against the tip of the doctor blade to get injured.

(8) Since wiping is carried out by holding the doctor blade between the wiper held by the operator's hand(s), it is quite difficult to hold the doctor blade by the wiper with a predetermined holding pressure and to maintain the predetermined holding pressure while moving the wiper in the longitudinal direction of the doctor blade, and the holding pressure becomes too strong or too weak. As a result, some places are wiped out sufficiently and some are not, and the residual ink adhered to the doctor blade cannot be removed sufficiently. Also, the doctor blade cannot be wiped out uniformly.

When ink is filled and the ink amount is measured by a doctor blade which has not been sufficiently wiped out, the ink adhered to the doctor blade is mixed with ink newly supplied to the intaglio roll, and thus a different kind of ink is mixed every time when the ink is exchanged to another kind. Also, when the tip of the doctor blade becomes uneven, the scraping-off of unnecessary ink is unevenly done, and it becomes difficult to secure the filling and measuring into all the ink cells of the intaglio roll.

Furthermore, if the ink is not wiped out sufficiently and uniformly, the tip of the doctor blade becomes uneven due to the adhered ink, and thus some ink cells have enough ink and some have less ink, which causes an unevenness in the amount of the ink in the ink cells, and the film thickness becomes uneven. Therefore, for example, when a macromolecular thin-film pattern such as a liquid crystal orientation film is formed, problems are caused in that the film thickness becomes uneven to cause an unevenness in the display and the functions of the thin-film are deteriorated.

(9) Since the drying of a doctor blade is carried out by holding a gas ejecting means for drying by the hand of an operator, it is quite difficult to maintain a predetermined distance between the gas ejecting means and the doctor blade while moving the gas ejecting means in the longitudinal direction of the doctor blade, and the distance tends to become large or small. As a result, some places are dried sufficiently and some are not, and thus the doctor blade cannot be dried uniformly.

When a doctor blade which has not been uniformly dried is used, solvent used for wiping is mixed in new ink supplied to the intaglio roll. Therefore, in the case where a macromolecular thin-film pattern, such as a liquid crystal orientation film, is formed by using such an ink, problems are caused in that the insulating property is deteriorated and the functions of the thin-film are deteriorated due to the unevenness in the film thickness and in the orientation.

Therefore, the object of the present invention is to overcome the above-mentioned problems, and to provide a thin-film forming apparatus and a thin-film forming method which can improve the functions of the thin-film and the working efficiency, by automating the printing preparatory works without using operator's hands.

DISCLOSURE OF THE INVENTION

In order to attain the objects described above, the present invention is constituted as described below:

Namely, according to one embodiment of the present invention, there is provided a thin-film forming apparatus, which includes a printing device having an intaglio roll having a plurality of ink cells, an ink supply means which fills ink into the ink cells, a doctor blade for wiping the barrel surface of the intaglio roll, a printing roll having an elastic plate, to which the ink of the intaglio roll is transferred, wound on the barrel thereof, and a printing table which fixes the to-be-printed material, to which the ink of the printing roll is transferred, wherein it is constituted so that it includes a articulated robot provided adjacent to the printing device, and an implementation means for the printing preparatory works which performs at least one operation among mounting/dismounting operation of the elastic plate, which is mounted to the arm of the articulated robot, to/from the printing roll, the operation to wipe the ink in the periphery of the intaglio roll, and the operation to wipe the ink of the doctor blade.

According to the constitution, the printing preparatory works can be automated without the operators, and the functions of the thin-film and the working efficiency can be improved.

BRIEF DESCRIPTION OF THE DRAWINGS

These and other objects and features of the present invention will become clear from the following description taken in conjunction with the preferred embodiments thereof with reference to the accompanying drawings, in which.

DESCRIPTION OF THE PREFERRED EMBODIMENTS OF THE PRESENT INVENTION

Figure 1:
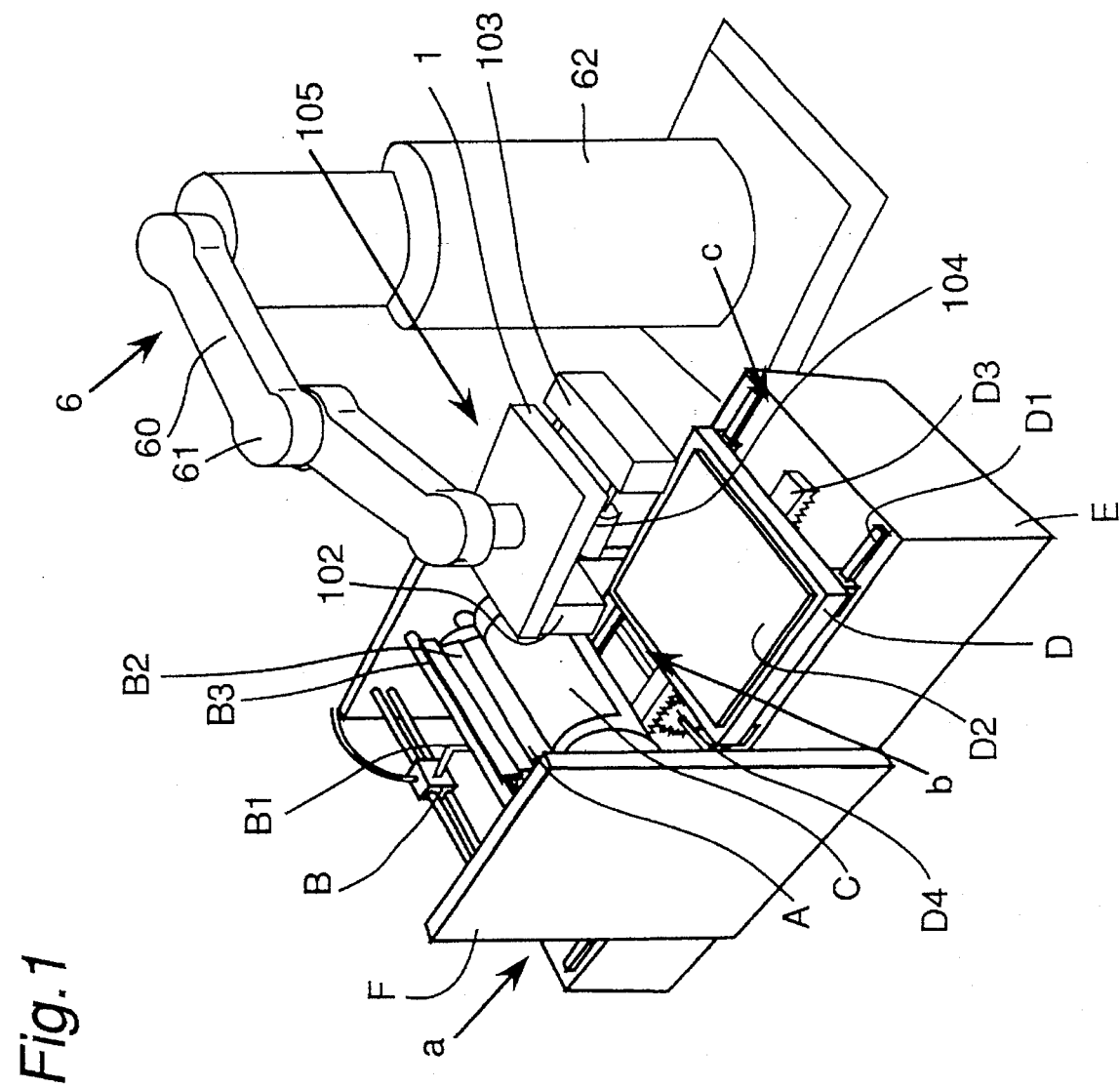
FIG. 1 is a perspective view showing a first embodiment of the thin-film forming apparatus of the present invention.
Figure 2:
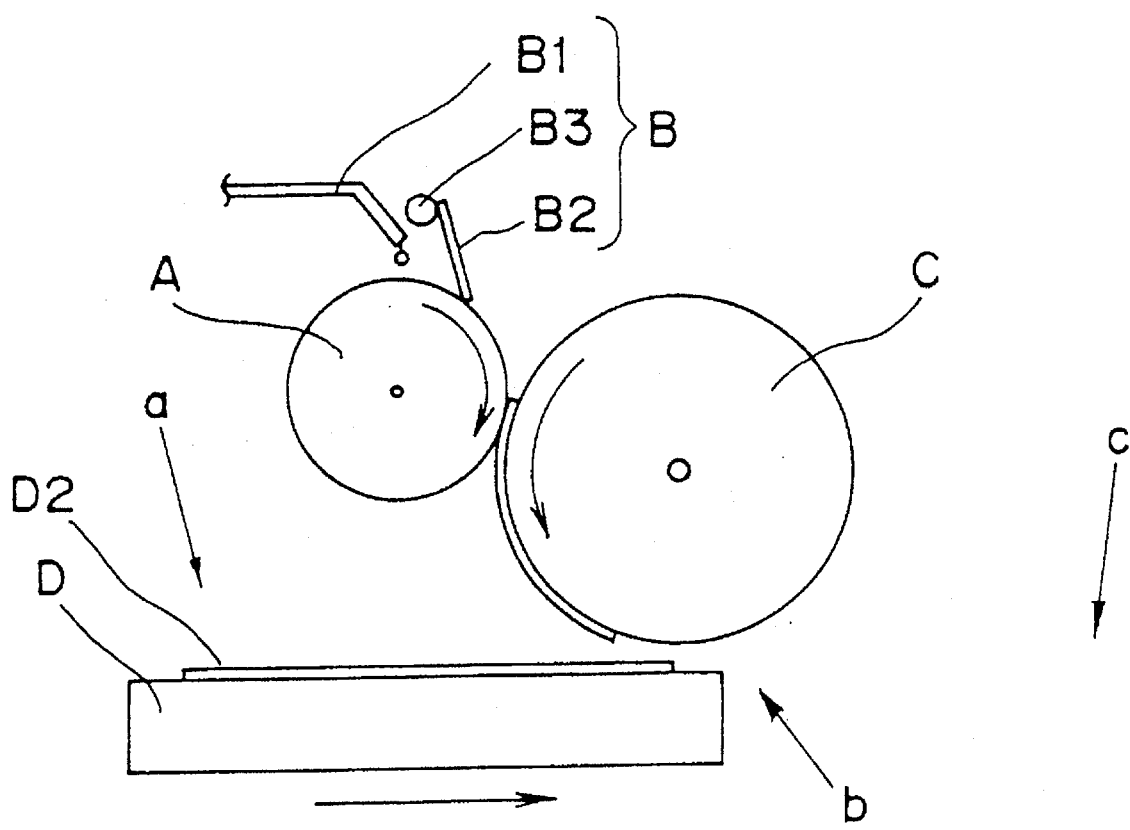
FIG. 2 is a diagram illustrating the side of the printing device of the thin-film forming apparatus.

Before the description of the present invention proceeds, it is to be noted that like parts are designated by like reference numerals throughout the accompanying drawings.

The first embodiment of the present invention will now be described with reference to the drawings.

The thin-film forming apparatus and the thin-film forming method in accordance with the first embodiment is described below.

In the thin-film forming apparatus and the thin-film forming method of the first embodiment, since a thin-film is formed on a to-be-printed material by a printing device, after mounting/dismounting of an elastic plate is carried out by using a hand mounted on the arm of a articulated robot in an elastic plate automatic mounting/dismounting device, the elastic plate can be automatically mounted to the barrel of a printing roll, and the elastic plate can also be automatically dismounted after the printing, and thus the series of processes of the thin-film forming can be carried out smoothly to improve the efficiency of the thin-film forming.

Furthermore, by the elastic plate automatic mounting/dismounting device, while the distance between the hand body and the stretching chuck means is adjusted by automatically moving the rod back and forth from the air cylinder body of the elastic plate tension-adjusting means to automatically adjust the tension of the elastic plate, the elastic plate is mounted on the barrel of the printing roll, and thereafter, a thin-film is formed on the to-be-printed material by the printing device.

Accordingly, even if excessive tension is applied to the elastic plate or tension is short to cause the slackening, just before the elastic plate is wound round the barrel of the printing roll and during being wound, the tension applied to the elastic plate is automatically adjusted to a predetermined value by the elastic plate tension-adjusting means, and thus a tension of a predetermined magnitude is always applied to the elastic plate.

As a result, the elastic plate can be neatly mounted on the barrel of the printing roll without wrinkles or waves. Therefore, if the ink is transferred to the elastic plate, and further to the to-be-printed material, there is no difference in the transferred amount, and a thin-film having an uniform film thickness can be formed on the to-be-printed material.

Concretely, the process is effected as described below.

The tension applied to the elastic plate is a composite force including a force for stretching the elastic plate by the rotation of the barrel of the printing roll and a force for oppositely stretching the elastic plate by the rod of the air cylinder. The distance between the hand body of the elastic plate automatic mounting/dismounting device of the present invention and the stretching chuck means varies automatically according to the magnitude of the tension applied to this elastic plate.

For example, when the movement of the hand body becomes a little slower than the rotation of the barrel of the printing roll while the elastic plate is wound round the barrel of the printing roll, the tension applied to the elastic plate exceeds the predetermined value, and the rod is moved back to the air cylinder body to make the distance small between the elastic plate tension-adjusting means and the stretching chuck means. As a result, the distance between the first elastic plate holder and the second elastic plate holder is kept at a certain level, and thus, the tension applied to the elastic plate becomes a predetermined value.

On the contrary, when the movement of the hand body becomes a little faster than the rotation of the barrel of the printing roll while the elastic plate is wound round the barrel of the printing roll, the tension applied to the elastic plate becomes smaller than the predetermined value, and in order to increase the tension up to the predetermined value, the rod is moved forward from the air cylinder body to make the distance large between the elastic plate tension-adjusting means and the stretching chuck means. As a result, the distance between the first elastic plate holder and the second elastic plate holder is kept at a certain level, and thus, the tension applied to the elastic plate becomes a predetermined value.

Furthermore, by the elastic plate automatic mounting/dismounting device, the size of the angle for stretching the elastic plate by means of the stretching chuck means is adjusted by rotating the elastic plate tension-adjusting means and/or the stretching chuck means against the hand body, and while automatically adjusting the direction for stretching the elastic plate, the elastic plate is mounted on the barrel of the printing roll, and thereafter, a thin-film is formed on the to-be-printed material by the printing device.

Accordingly, even if slackening is caused in a part of the elastic plate, just before the elastic plate is wound round the barrel of the printing roll and during being wound, the direction of stretching the elastic plate is automatically corrected by the elastic plate tension-adjusting means, and thus, the elastic plate can be maintained in the state of being stretched tautly so that the uniform tension is applied to the whole elastic plate.

As a result, the elastic plate can be neatly mounted on the barrel of the printing roll without wrinkles or waves. Therefore, if the ink is transferred to the elastic plate and further to the to-be-printed material, there is no difference in the transferred amount, and a thin-film having an uniform film thickness can be formed on the to-be-printed material.

Concretely, the process is effected as described below.

Namely, the direction to stretch the elastic plate by the stretching chuck means is automatically adjusted according to slackening generated in a part of the elastic plate.

Figure 12:
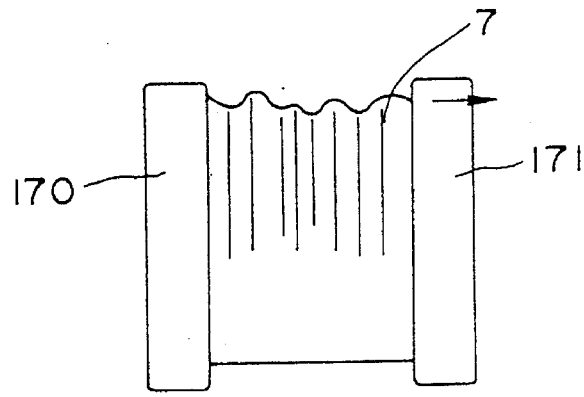
FIG. 12 is a diagram illustrating the state of the elastic plate when it is mounted by the conventional thin-film forming method.
Figure 13:
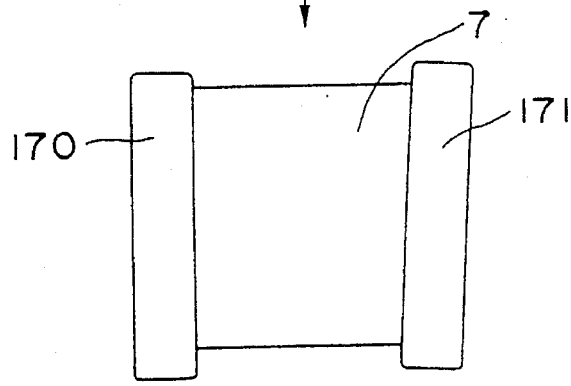
FIG. 13 is a diagram illustrating the state of the elastic plate which is stretched taut so that there is no slackening, in the embodiment of the thin-film forming method according to the present invention.

For example, in the case (A) where it is difficult to stretch the elastic plate tautly due to the slackening generated in a part of the elastic plate, if the elastic plate is not stretched in the state that the first elastic plate holder and the second elastic plate holder of the elastic plate are not parallel, that is, in the state of, so called, a slant shift (see FIG. 12), the stretching chuck means is rotated on the right by the amount of the angular shift with respect to the hand body, centering around the rotation axis of the stretching chuck means, and the elastic plate is stretched tautly (see FIG. 13).

Or, in the case (B) where it is difficult to stretch the elastic plate tautly due to the slackening generated in a part of the elastic plate, if the elastic plate is not stretched in the state that the second elastic plate holder is not located in the front of the first elastic plate holder, that is, in the state of, so called, a parallel shift (see FIG. 14), the elastic plate tension-adjusting means is rotated on the left by the necessary angle with respect to the hand body, centering around the rotation axis of the mounting means. Furthermore, the stretching chuck means is rotated on the right by the necessary angle with respect to the bearing body of the elastic plate tension-adjusting means, centering around the rotation shaft of the stretching chuck means, to make the first elastic plate holder and the second elastic plate holder parallel (see FIG. 10), and thus, the elastic plate is stretched taut (see FIG. 15).

First, the elastic plate automatic mounting/dismounting device of the thin-film forming apparatus according to the first embodiment is described below.

Figure 3:
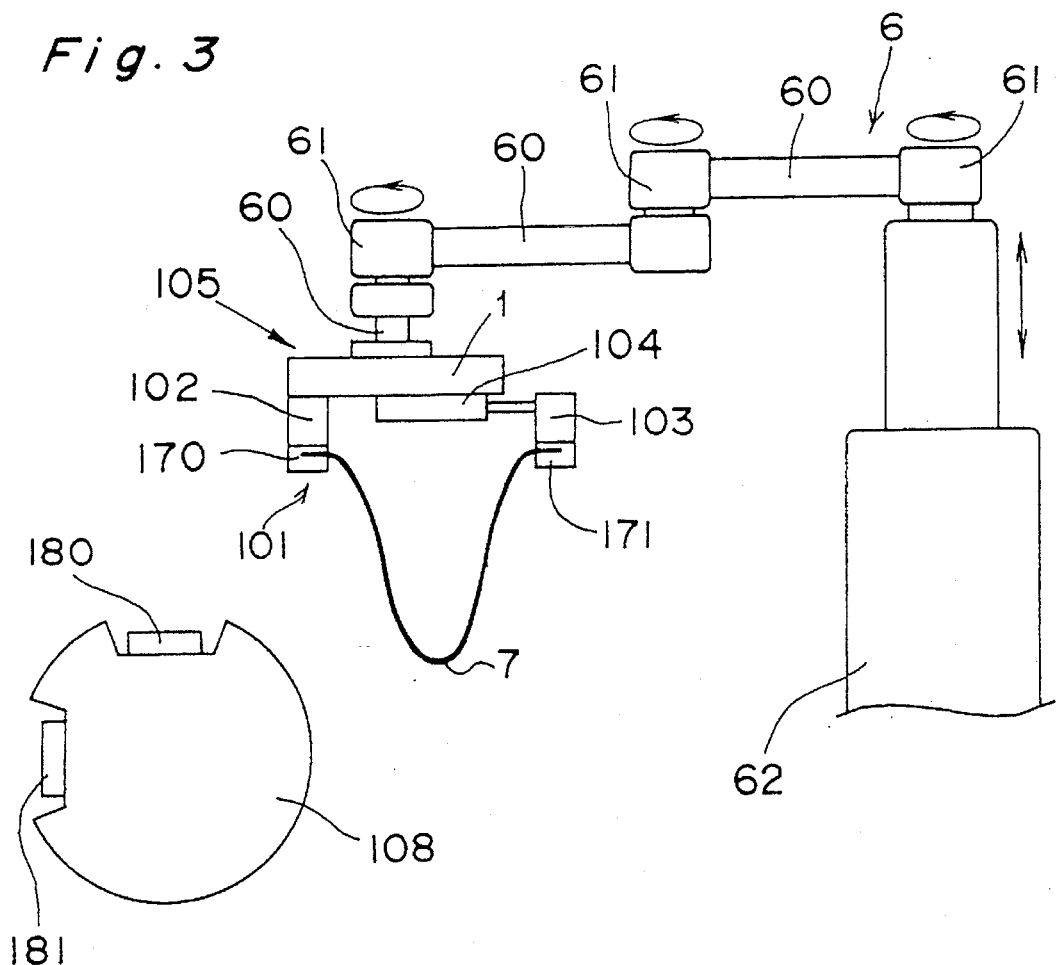
FIG. 3 is a diagram illustrating an elastic plate automatic mounting/dismounting device of the thin-film forming apparatus.

In the elastic plate automatic mounting/dismounting device 101, as shown in FIG. 1 and FIG. 3, a hand 105 is mounted on the arm 60 of the articulated robot 6.

The articulated robot 6 is a general-purpose industrial robot, and plural arms 60 are flexibly linked horizontally and vertically via the joints 61. Namely, the articulated robot 6 may be a horizontal articulated robot, a vertical articulated robot, or an orthogonal articulated robot. It has a structure that the hand 105 is mounted at one end of the group of arms where the plural arms 60 are gathered, and the other end is supported by a robot base 62. The joints 61 are parts which bend and run the arms 60 by a plurality of stages, or by no stages, by means of an oil pressure, a water pressure, or a motor. The robot base 62 is a part which drives the group of arms vertically in a multistage or non-stage manner, by means of an oil pressure, a hydraulic pressure, or a motor.

The hand 105 has a hand body 1, a fixed chuck means 102, a stretching chuck means 103, and an elastic plate tension-adjusting means 104 (see FIG. 1 and FIG. 3).

The hand body 1 is a rectangular plate having a proper thickness, and the arm 60 of the articulated robot 6 is fixed on the center of the surface thereof. The hand body 1 can be freely moved, e.g., in the vertical and horizontal directions, and in the rotational direction centering around the arms 60, by driving the arms 60 of the articulated robot 6. A mounting means 140 shown in FIG. 8 may be also provided in the hand body 1.

The elastic plate 7 which is mounted along the peripheral direction on the barrel surface of the barrel 108 of the cylindrical printing roll is a soft plate made of rubber or nylon resins, and may be a letterpress plate in which a convex portion is formed on the surface in a desired pattern, or an intaglio plate or a planographic plate. When the elastic plate 7 is mounted on the barrel 108 of the printing roll, both ends in the peripheral direction are held by the first elastic plate holder 170 and the second elastic plate holder 171. The first elastic plate holder 170 and the second elastic plate holder 171 are the member in which chuck holes for a hand 175, chuck holes for a printing roll 176, and chuck holes for positioning 177 are formed symmetrically side by side with respect to the transversely-extended center line of the elastic plate holder (see FIG. 11). The elastic plate 7 wound round the barrel 108 of the printing roll is a from plate for printing which transfers ink to carry out the printing by adhering the ink for printing to the top of the convex portion and bringing the convex portion into contact with the surface of the to-be-printed material.

The fixed chuck means 102, as shown in FIG. 1 and FIGS. 3–7, has a mechanism which can hold the first elastic plate holder 170 of the elastic plate holder 7 or release it, and is fixed along one edge of the hand body 1 on the back side of the hand body 1. The fixing method of the fixed chuck means 102 to the hand body 1 is not limited to the method described above, and may be fixed to the mounting means 140 described below (see FIGS. 8–10).

Figure 4:
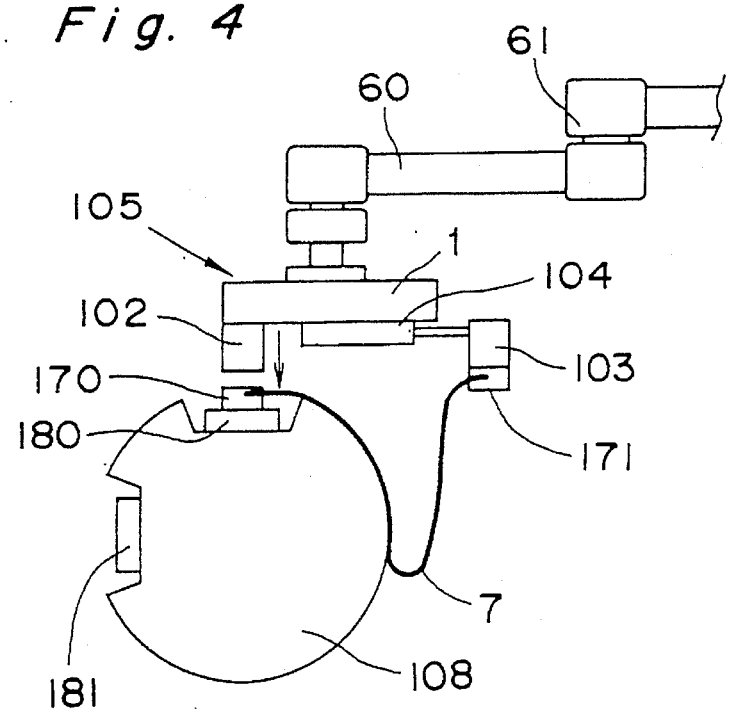
FIG. 4 is a diagram illustrating an elastic plate automatic mounting/dismounting device of the thin-film forming apparatus.

As shown in FIGS. 3 and 4, the fixed chuck means 102 has a magnetic force-type fixing mechanism composed of a chuck body 121 and an electromagnet (not shown) exposed on the surface of the chuck body 121. In this magnetic force-type holding mechanism, the elastic plate holder is held by the chuck body 121 by bringing the chuck body 121 of the fixed chuck means 102 into contact with the elastic plate holder, made of metal, of the elastic plate 7, and thus generating a magnetic force by the electromagnet. When the holding of the elastic plate holder is released, the magnetic force of the electromagnet has only to be extinguished.

Furthermore, as another example of the fixed chuck means 102, there can be mentioned the one having a vacuum suction-type fixing mechanism which provides vacuum suction holes (not shown) on the face brought in contact with the elastic plate holder of the chuck body 121. In this vacuum suction-type fixing mechanism, the elastic plate holder is held by the chuck body 121 by bringing the chuck body 121 of the fixed chuck means 102 into contact with the elastic plate holder, and vacuum-sucking from the vacuum suction holes. When the holding of the elastic plate holder is released, the vacuum suction is stopped.

Figure 16:
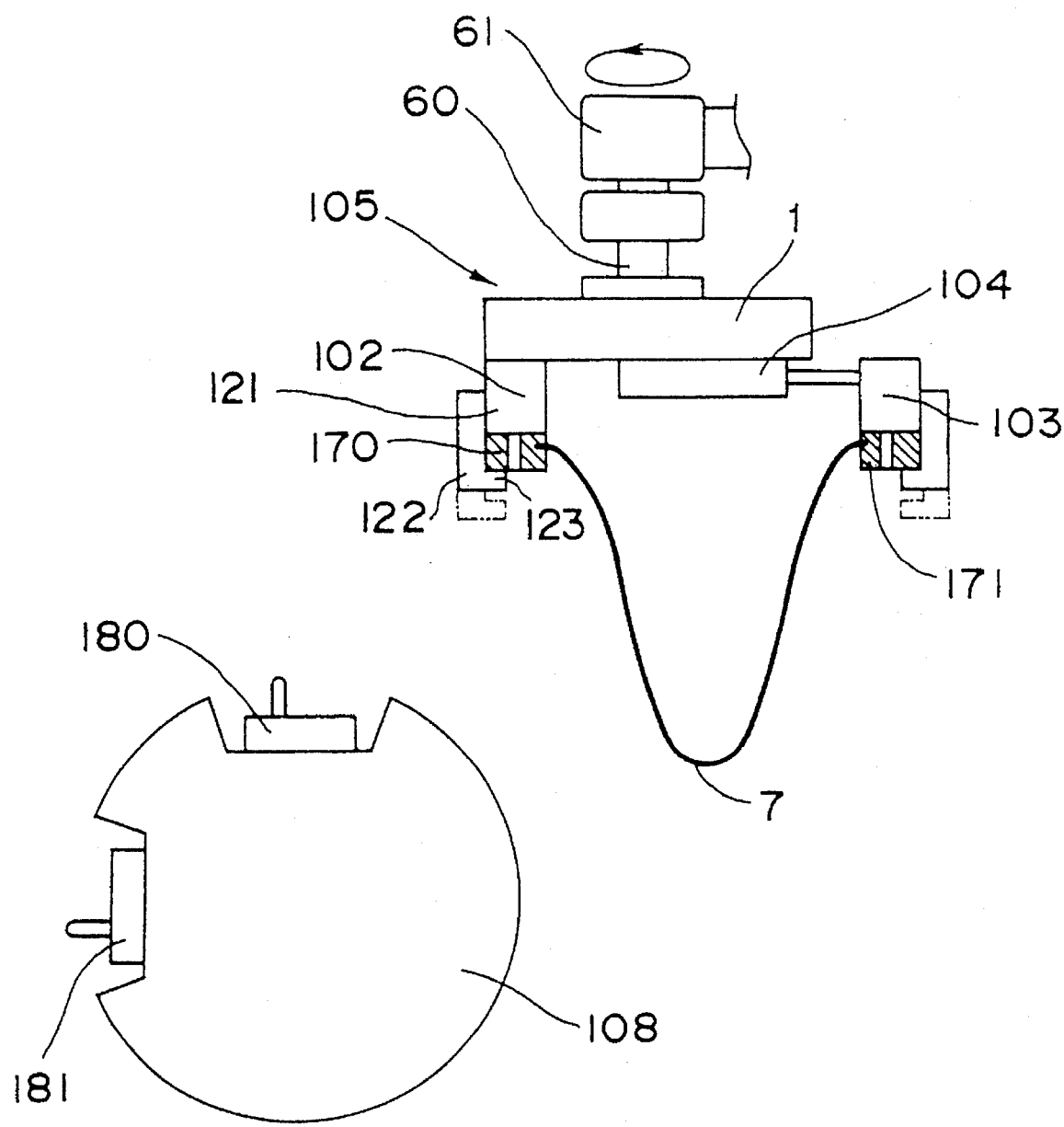
FIG. 16 is a view showing other examples of structures of a fixed chuck means, a stretching chuck means, the first chuck means and the second chuck means.

Furthermore, as another example of the fixed chuck means 102, there can be mentioned the one, for example as shown in FIG. 16, which includes a chuck body 121, a driving unit 122 mounted on the side of the chuck body 121, and a holding portion 123 having an L-shaped section and driven in a vertical direction shown in the figure by the driving unit 122. In such a fixing mechanism, the driving unit 122 drives the holding portion 123 in the vertical direction, and the first elastic plate holder 170 of the elastic plate 7 is held between the chuck body 121 and the holding portion 123, or the holding is released.

Figure 9:
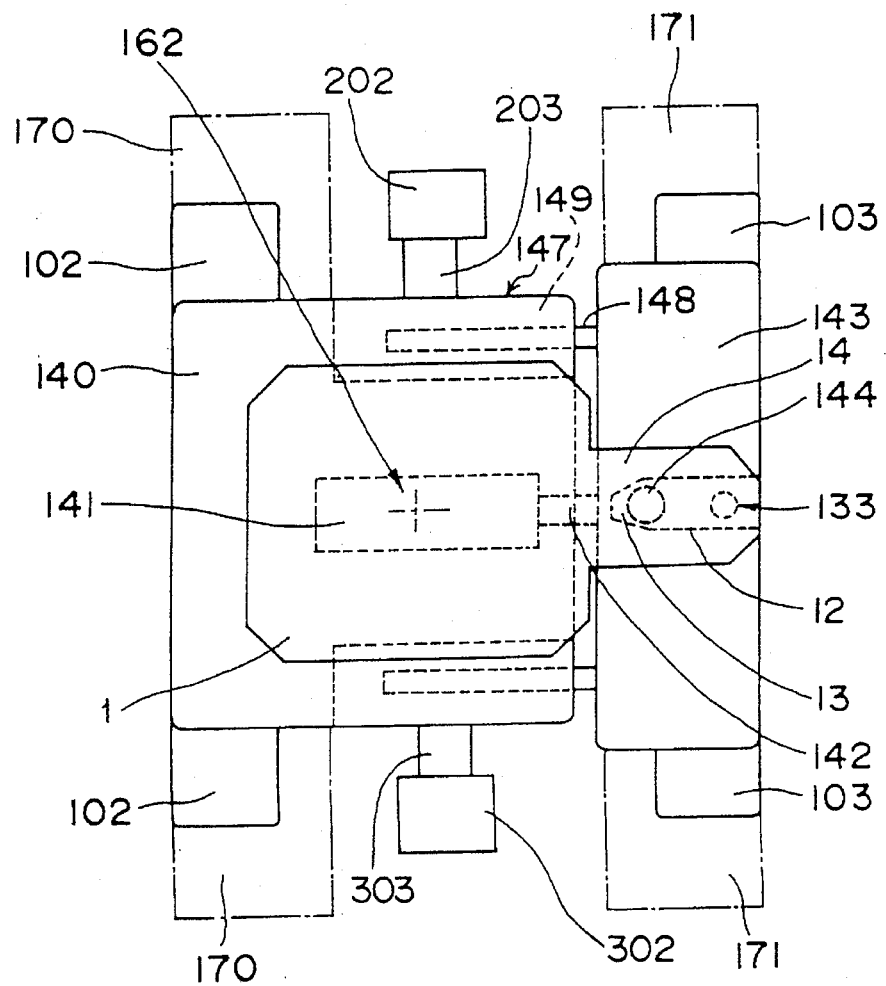
FIG. 9 is a top view of FIG. 8.

The stretching chuck means 103 is provided on the rear face of the hand body 1, in opposition to the fixed chuck means 102, and has a function to hold the second elastic plate holder 171 of the elastic plate 7 held by the fixed chuck means 102 or release the hold thereof. As a concrete mechanism, the stretching chuck means 103 adopts the similar mechanism as that of the fixed chuck means 102. The stretching chuck means 103 is also moved back and forth in the direction of expanding and contracting the distance between the opposite fixed chuck means 102 and the stretching chuck means 103 along the back side of the hand body 1. As a simple mechanism for such back-and-forth movement and mounting of the chuck means 103 to the hand body 1, the stretching chuck means 103 can be directly mounted on the tip of the driving shaft of an air cylinder provided on the rear of the hand body 1 (see FIG. 1 and FIGS. 3–7). In order to guide and assist the movement of the stretching chuck means 103 against the hand body 1, a guide means 147 is provided on both sides of the air cylinder on the rear face of the hand body 1, as shown in FIG. 9. The guide means 147 includes guide rods 148 which are elongated in the same direction as the rod 142 and has one end mounted to the stretching chuck means 103, and guide members 149 which guide the guide rods 148 for the reciprocating motion in the axial direction of the guide rods 148.

Figure 8:
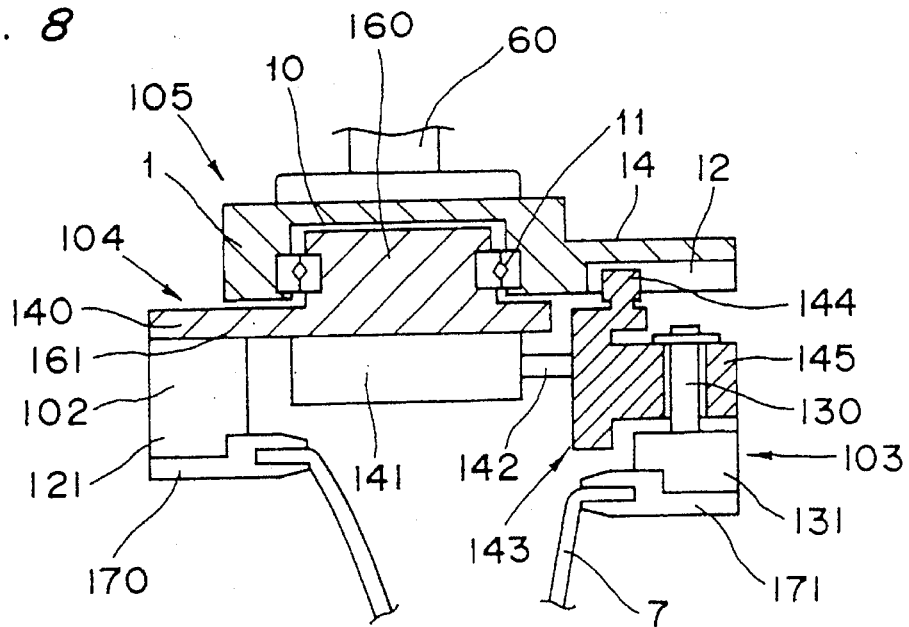
FIG. 8 is an enlarged sectional diagram illustrating the main part of a variation of the elastic plate automatic mounting/dismounting device of the thin-film forming apparatus.

In FIGS. 8–9, there is shown a case where the stretching chuck means 103 has a chuck body 131 and a bearing body 143, and FIGS. 8–9 do not disclose a structure that the stretching chuck means 103 is directly mounted to the tip of the driving shaft of the air cylinder, but it discloses a mechanism in the more preferred embodiment, wherein the bearing body 143 is mounted.

The elastic plate tension-adjusting means 104 has a back and forth movement mechanism such as an air cylinder or a spring in order to expand and contract the distance between the hand body 1 and the stretching chuck means 103, and one end of the elastic plate tension-adjusting means 104 is fixed to the fixed chuck means 102, and the other end thereof is fixed to the stretching chuck means 103.

As another concrete structure of the elastic plate tension-adjusting means 104, there can be mentioned a structure having an air cylinder body 141 and a rod 142, as shown in FIG. 8.

The mounting means 140 is composed of a mounting portion 161 which is a rectangular plate, and a substantially columnar rotation shaft 160 projecting roughly at the central portion on the surface of the mounting portion 161, as shown in FIGS. 8 and 9. The rotation shaft 160 enters the bearing part 10 having a concave shape and formed in the inside of the hand body 1, and can rotate horizontally against the lower face of the hand body 1 via a rotation guide 11 composed of a roller bearing. Accordingly, the mounting means 140 rotates as required so as to be able to stretch the elastic plate 7 in such a direction that there is caused no slackening in the elastic plate 7 (see FIG. 10). A linear slide guide may be formed in the inside of the hand body 1, and the mounting means 140 may be moved linearly and slidably along the linear slide guide.

Furthermore, a fixed chuck means 102 is fixed on the back side of the mounting portion 161.

The air cylinder body 141 has a rod 142 which back and force moves in the axial direction of the air cylinder body 141 by supplying air into the air cylinder body 141 and discharging the air therefrom, and is fixed at substantially central portion on the back side of the mounting portion 161 of the mounting means 140, in the vertical direction with respect to the elongated direction of the stretching chuck means 103.

In the present embodiment, the above-described guide means 147 are provided on both sides of the air cylinder body 141 on the back side of the mounting portion 161.

A bearing body 143 is mounted on the end portion of the rod 142 of the air cylinder 141. A tip of the guide rod 148 of the guide means 147 is also mounted to the bearing body 143. The bearing body 143 has a cam follower 144 and a bearing part 145. On the other hand, a projection 14 elongated in the back-and-forth-movement direction of the rod 142 is formed on the hand body 1 corresponding to the stretching chuck means 103, and on the projection 14, there is formed a cam follower guide groove 12 which is wider than the diameter of the cam follower 144 so that the cam follower 144 can slidably move therein (see FIG. 9).

The bearing body 143 is interlocked with the back-and-forth movement of the rod 142 of the air cylinder, and thus moves linearly in the back and forth direction with respect to the fixed chuck means 102 and the mounting means 140, within the range of the lengthwise direction of the cam follower guide groove 12 (which corresponds to the distance in the right and left direction in FIG. 8 and FIG. 9).

Furthermore, when the mounting means 140 rotates round the rotation center 162 of the mounting means 140, the bearing body 143 together with the mounting means 140 rotates round its axis against the hand body 1 within the range of the widthwise direction of the cam follower guide 12 (which corresponds to the distance in the vertical direction in FIG. 9). The bearing body 143 can perform the linear movement and the axial rotation separately, or simultaneously.

Furthermore, the rod 142 may go back toward the air cylinder body 141 and the cam follower 144 may be fitted into the V-shaped portion 13 of the cam follower guide groove 12 so that the cam follower 144 cannot move in the lengthwise direction and also in the widthwise direction of the cam follower guide groove 12, and as a result, the bearing body 143 cannot be designed to rotate round the rotation center 162 of the mounting means 140.

In the present embodiment, the stretching chuck means 103 has a rotation axis portion 130, a chuck body 131, and a bearing body 143. The rotation axis portion 130 is rotatably fitted into the bearing part 145 of the bearing body 143 so that it can horizontally rotate against the lower face of the bearing body 143. Therefore, the stretching chuck means 103 rotates as required so that it can stretch the elastic plate 7 in the direction that there is caused no slackening in the elastic plate 7 (see FIG. 10).

A wiper holder means 202 for wiping the intaglio roll and/or a wiper holder means 302 for wiping the doctor blade may be attached to other places of the hand body 1 where the fixed chuck means 102, the stretching chuck means 103, and the elastic plate tension-adjusting means 104 are mounted.

Figure 10:
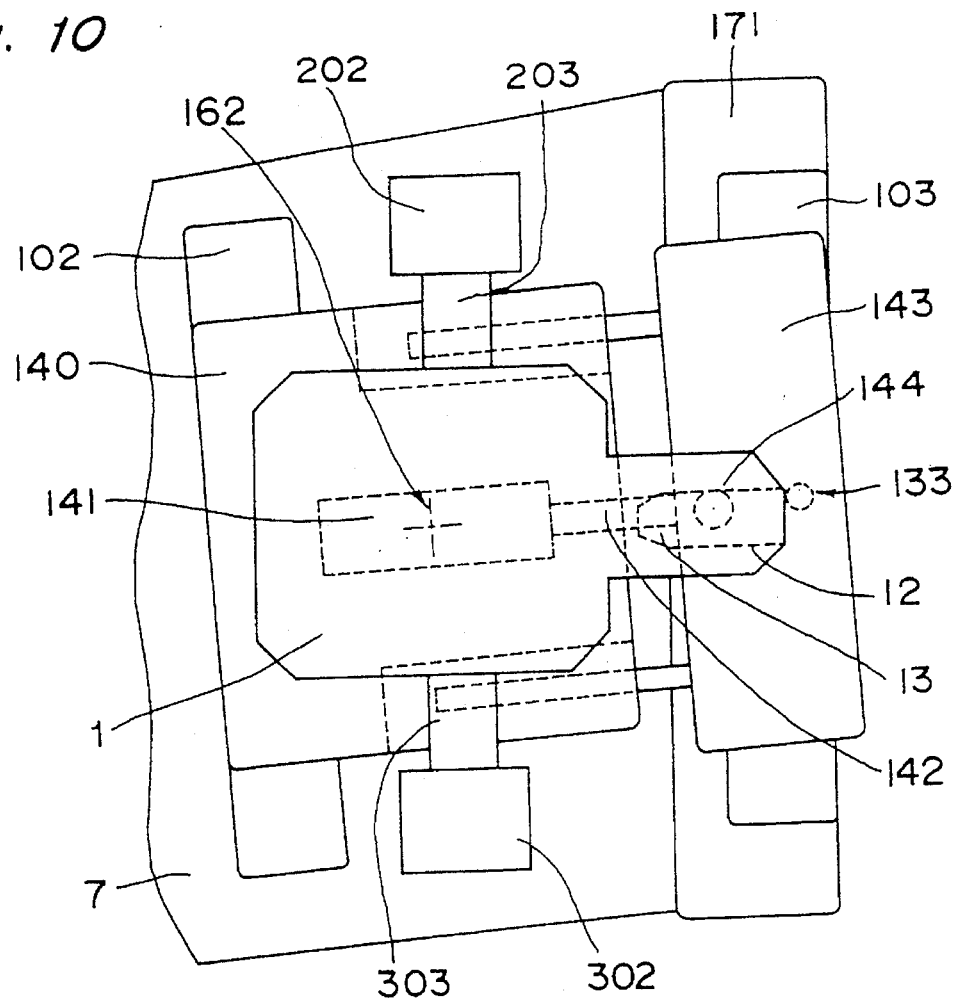
FIG. 10 is a top view where the pulling direction of the elastic plate is being adjusted in FIG. 9.

The wiper holder means 202 for wiping the intaglio roll is mounted, for example as shown in FIG. 9 and FIG. 10, to the hand body 1 or the mounting means 140, on the line orthogonally crossing the line which links the fixed chuck means 102 and the stretching chuck means 103, via a repulsion-pressing means 203. When it is required to remove the unnecessary ink which is left in the ink cells of the intaglio roll, a wiper composed of an non-woven fabrics or the like which has been saturated with solvent is held by a wiper holder means 202 for wiping the intaglio roll, and the surface of the intaglio roll is wiped with the wiper by rotating the hand body 1 or the mounting means 140 by 90 degree and driving the arm 60 of the articulated robot 6. The repulsion-pressing means 203 is a means which utilizes the repulsive force of a spring, an air cylinder or the like to press the wiper to the barrel of the intaglio roll with a predetermined contact pressure.

Furthermore, the wiper holder means 302 for wiping the doctor blade is mounted, for example as shown in FIG. 9 and FIG. 10, to the hand body 1 or the mounting means 140 via a repulsion-pressing means 303, to a position opposite to the wiper holder means 202 for wiping the intaglio roll. When it is necessary to remove the unnecessary ink which is left in the doctor blade, a wiper composed of non-woven fabrics or the like which has been saturated with solvent is held by the wiper holder means 302 of the doctor blade, and the surface of the doctor blade is wiped with the wiper by rotating the hand body 1 or the mounting means 140 by 90 degree and driving the arm 60 of the articulated robot 6. The repulsion-pressing means 303 is a means which utilizes the repulsive force of a spring, an air cylinder, or the like to bring the wiper into contact with the tip of the doctor blade with a predetermined contact pressure and to hold the upper and lower faces of the doctor blade by the wiper with a predetermined holding pressure.

Figure 17:
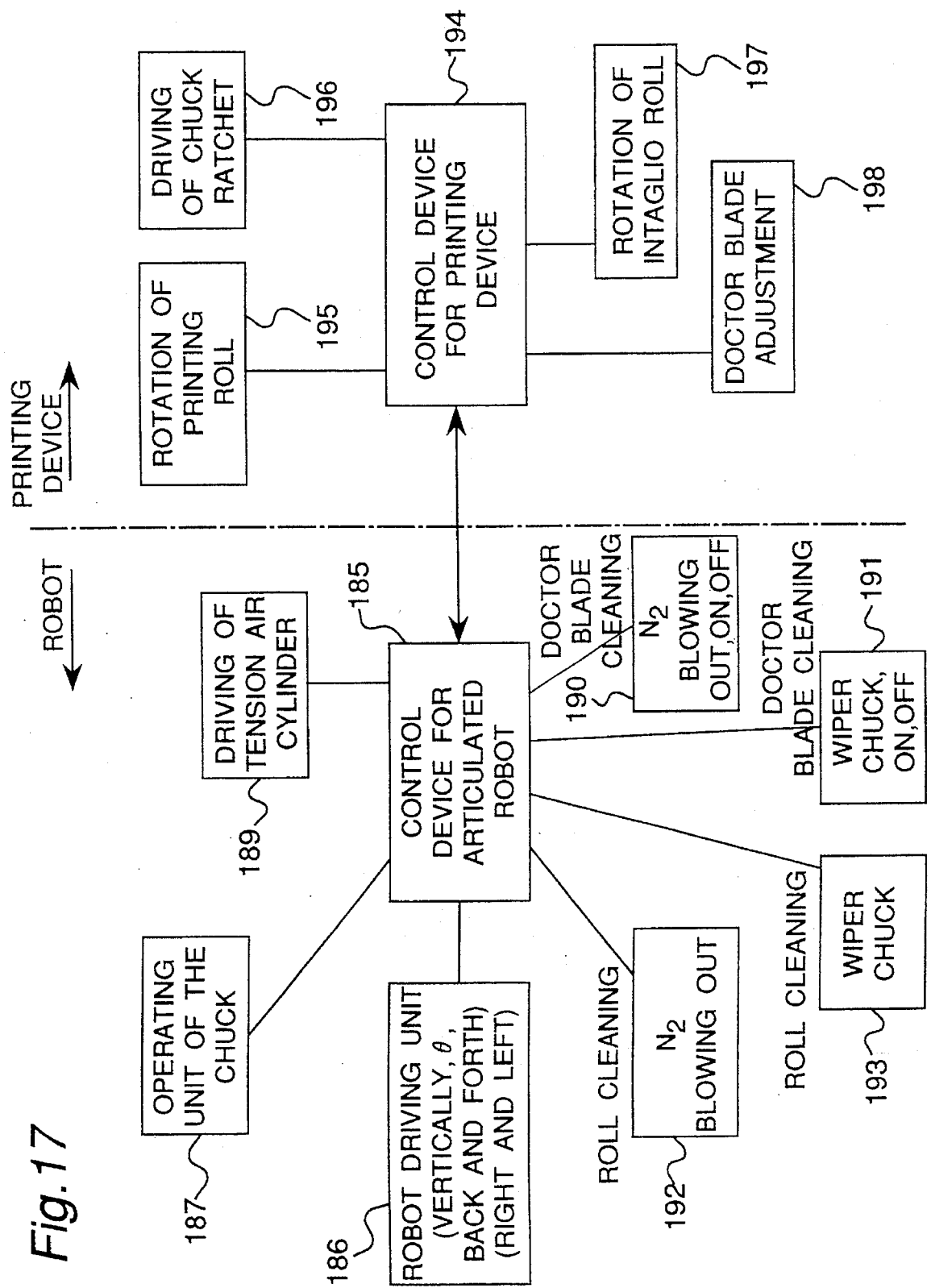
FIG. 17 is a block diagram of a circuit portion which controls the thin-film forming apparatus.

The action of the elastic plate automatic mounting/dismounting device described above is controlled by the control device 185 shown in FIG. 17 and provided on the articulated robot 6. To the control device 185 are electrically connected, respectively, a driving unit 186 of the arms 60 etc. of the articulated robot 6, a chuck operating part 187 which operates the stretching chuck means 103, a driving part 189 of the rod 142 of the air cylinder 141 of the elastic plate tension-adjusting means 104, an operating part 190 which carries out the gas ejecting action at the time of cleaning the doctor blade, an operating part 191 which carries out the holding action of the wiper at the time of cleaning the doctor blade, an operating part 192 which carries out the gas ejecting action at the time of wiping the intaglio roll, and an operating part 193 which carries out the holding action of the wiper at the time of wiping the intaglio roll.

FIG. 17 is a figure common to the second and third embodiments described below, and includes compositions which are not used in the present embodiment described above.

The printing device of the thin-film forming apparatus in accordance with the present embodiment is described below.

The printing device is composed of an intaglio roll A having a plurality of ink cells, an ink supply means B which fills ink into the ink cells, a printing roll C having on the barrel an elastic plate to which the ink of the intaglio roll is transferred, and a printing table D which fixes the to-be-printed to which the ink of the printing roll is transferred.

In the printing device, a supporting frame F is formed on the central portion of the base E composed of a rectangular support, and on the supporting frame F are rotatably supported the intaglio roll A and the printing roll C. Also, on the upper part of the intaglio roll A, the ink supply means B is disposed. A printing table D is disposed on the upper face of the base 1.

The intaglio roll A has a barrel portion fixed on the rotation shaft, and the plurality of ink cells are provided on the surface of the barrel portion. Each ink cell has, for example, a depth of 10 to several tens of $\mu m$. The barrel portion abuts the convex portion of the elastic plate of the barrel of the printing roll C with a constant pressure.

The ink supply means B is composed of an ink supply nozzle B1 and a doctor blade B2. The ink supply means B constructs a pair of rails on the upper end portion of the supporting frame on the opposite side of the doctor to the intaglio roll A. On these rails, an ink supply body is movably provided, while the ink nozzle B1 of this ink supply body being extended to the upper direction of the doctor blade and above the surface of the intaglio roll A. The ink supply body moves back and forth along the pair of rails by driving of a motor or an air cylinder via a wire (not shown) to supply ink from the ink supply nozzle B1 to the intaglio roll A so that the ink can be gathered in the area where the doctor blade B2 contacts with the intaglio roll A. The ink has a viscosity of, for example, from several tens to 30,000 c.p.s., and is composed of mixture of synthetic resin or resin precursor and solvent. The doctor blade B2 is a plate-shaped body and is mounted on a doctor blade-supporting rod B3 mounted on the supporting frame F. By rotating the doctor blade-supporting rod B3, the doctor blade B2 contacts with or parts from the surface of the intaglio roll A.

The ink supplied from the ink supply nozzle B1 is filled into the ink cells and the filled amount of ink is measured and an excessive mount of ink is removed by the doctor blade B2. Thus, the ink supply means B spreads the ink dropped on the surface of the intaglio roll A over the surface of the intaglio roll A, fills the ink into the ink cells to form a film of the ink with high uniformity on the surface of the intaglio roll A.

In the printing roll C, the barrel portion is fixed to the rotation shaft thereof, and a soft elastic plate 7 composed of rubber such as butyl rubber, synthetic resin such as nylon resins, photosensitive rubber, photosensitive resin, or the like is mounted to the barrel portion or dismounted therefrom. The ink of the intaglio roll A is transferred to the elastic plate 7.

The printing table D is disposed on the base E. On the upper face of the base E, guide rails D1 are fixed, respectively, on both sides between the printing position "b" below the supporting frame F, a position "a" for putting a material to be printed (to-be-printed material) which is parted from below the supporting frame F towards the carry-in side of the to-be-printed material, and a carry-out position "c" which is parted from below the supporting frame F towards the carry-out side of the to-be-printed material. The printing table D moves on the base E, between respective positions "a", "b", and "c" along the guide rails. The to-be-printed material D2 is put on the printing table D at the position "a" for putting a to-be-printed material on the base E, is brought into contact with the printing roll C at the printing position "b" on the base E in order to transfer the ink of the elastic plate 7 of the printing roll C into the to-be-printed material D2 to carry out the printing, and is carried out at the carry-out position "c" on the base E.

The printing table D has the plate-shaped to-be-printed material D2 put on the upper face thereof, positions the to-be-printed material D2, and holds it. Furthermore, on the lower face of the printing table D, a rack D3 parallel to the guide rails D1 is mounted. A pinion D4 is interlocked with this rack D3, and is so constituted that the printing table D moves reciprocatingly and slidingly with the rack D3 by the regular and reverse rotations of this pinion D4.

The operation of the printing device described above is controlled by the control device 194 on the side of the printing device shown in FIG. 17. Also, the control device 194 is electrically connected to the control device 185, and these devices control the whole operation of the thin-film forming apparatus while exchanging the information with each other. The control device 185 and the control device 194 may not be separated in such a manner, and may be constituted as one control device. Also, to the control device 194 are electrically connected respective compositions of the operating part 195 of the rotation of the printing roll, the driving part 196 of the first chuck means 180 and the second chuck means 181 in the printing roll, the driving part 197 of the rotation of the intaglio roll, and the angle-adjusting part 198 of the doctor blade.

One embodiment of the thin-film forming method according to the present invention is described below.

First, at the elastic plate automatic mounting/dismounting device, the elastic plate 7 whose both ends are held by the first elastic plate holder 170 and the second elastic plate holder 171 is wound round the barrel 108 of the printing roll having the first chuck means 180 and the second chuck means 181.

Figure 11:
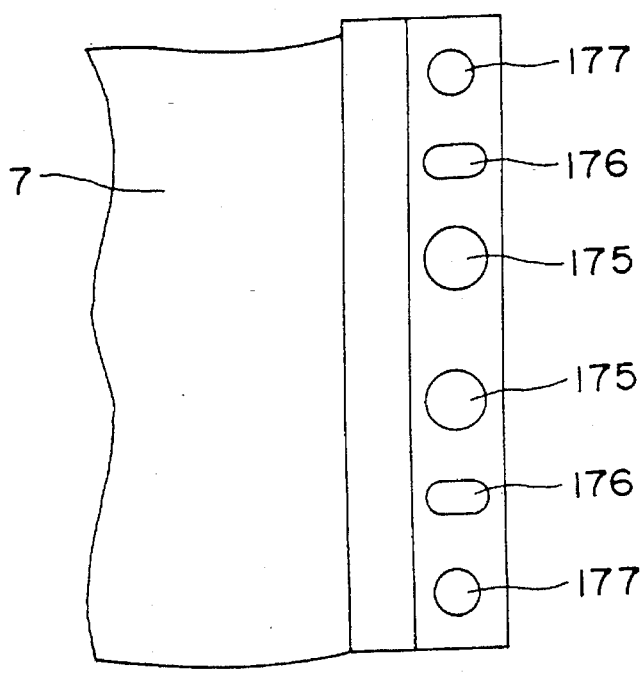
FIG. 11 is an enlarged view of the main part of the elastic plate and the elastic plate holder used for the elastic plate automatic mounting/dismounting in one embodiment of the thin-film forming method of the present invention.

The first elastic plate holder 170 and the second elastic plate holder 171 are members in which chuck holes 175 for the hand, chuck holes 176 for the printing roll, chuck holes 172 for positioning are formed symmetrically side by side with respect to the center of the elastic plate holder (see FIG. 11). As the first chuck means 180 and the second chuck means 181, there can be mentioned a magnetic force-type holding mechanism and a vacuum suction-type holding mechanism similar to those described with regard to the fixed chuck means 102 and the stretching chuck means 103 of the elastic plate automatic mounting/dismounting device in the present embodiment.

First, the first elastic plate holder 170 and the second elastic plate holder 171 of the elastic plate 7 in the slackened state are respectively held by the fixed chuck means 102 and the stretching chuck means 103 of the hand 105 of the elastic plate automatic mounting/dismounting device in the present embodiment (see FIG. 3).

The elastic plate 7 is put on the rack for the stand-by of the elastic plate in the slackened state so that the interval between the first elastic plate holder 170 and the second elastic plate holder 171 which hold the ends of the elastic plate 7 becomes equal to the interval between the fixed chuck means 102 and the stretching chuck means 103 of the hand 105.

To hold the first elastic plate holder 170 and the second elastic plate holder 171 by the fixed chuck means 102 and the stretching chuck means 103 may be carried out by the magnetic force-type holding mechanism, the vacuum suction-type holding mechanism, or the like.

Then, by driving the arms 60 of the articulated robot 6, the first elastic plate holder 170 of the elastic plate 7 is moved to the position of the barrel of the printing roll 108 where the first chuck means 180 is provided.

The driving of the arms 60 may be done by properly bending/stretching the arms 60 via the joints 61 of the articulated robot 6, or by vertically moving the robot base 62.

Figure 18:
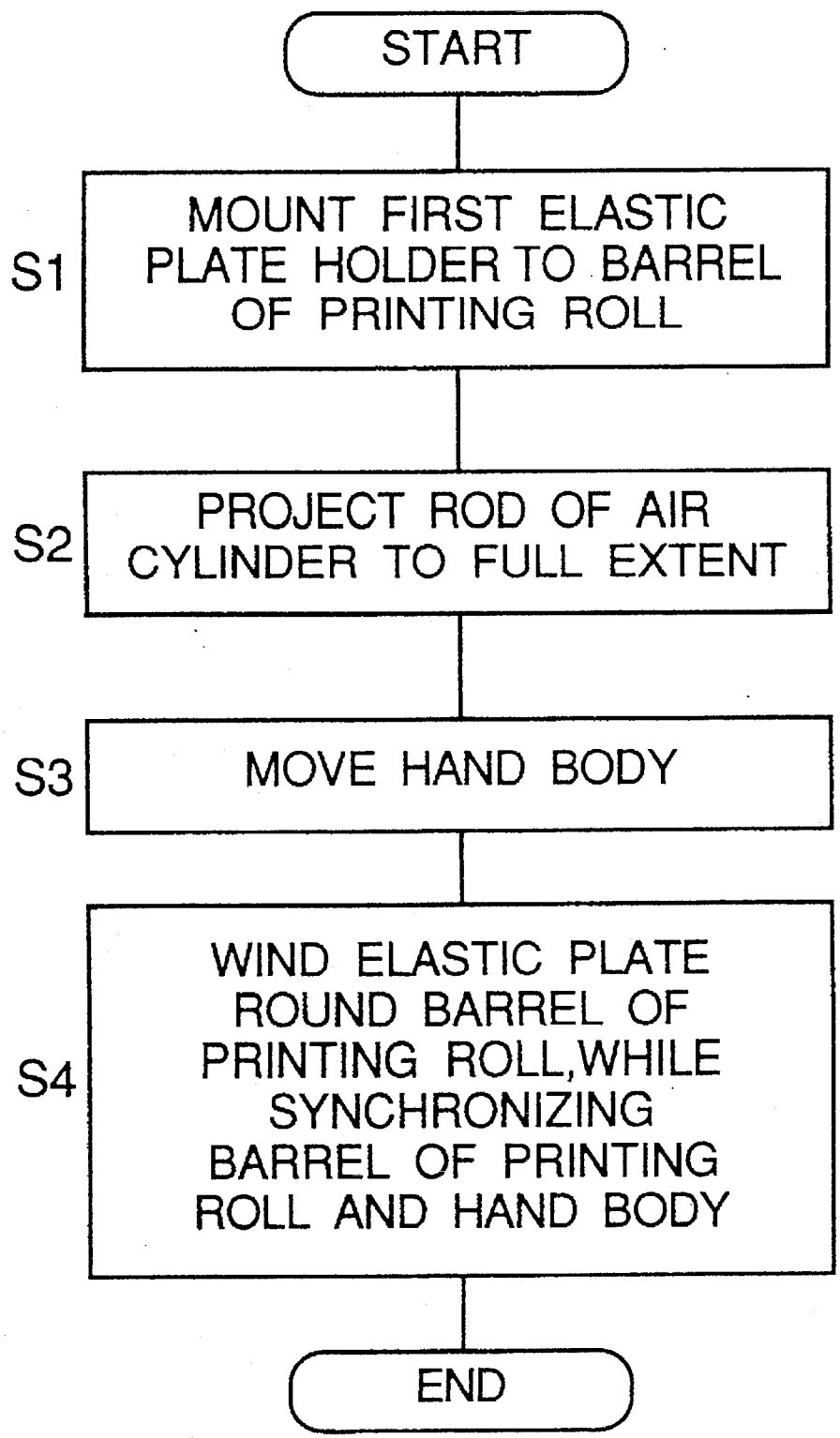
FIG. 18 is a flowchart illustrating the steps taken when the elastic plate is mounted on the barrel of the printing roll, in the thin-film forming apparatus of the embodiment.

Then, the first elastic plate holder 170 of the elastic plate 7 is transferred from the fixed chuck means 102 of the hand 105 to the first chuck means 180 of the barrel 108 of the printing roll and vice versa (see FIG. 4 and step 1 of FIG. 18). This transfer is performed by excitation and demagnetization of an electromagnet, in the case where, for example, magnetic force-type holding mechanisms are adopted as the fixed chuck means 102 and the first chuck means 180.

After the first elastic plate holder 170 is held by the first chuck means 180 in the above manner, the air is supplied from the air supply source to the air cylinder 141 which constitutes the elastic plate tension-adjusting means 104, so that the state that the rod 142 of the air cylinder 141 is extended to the full extent is made (see step 2 of FIG. 18).

Figure 5:
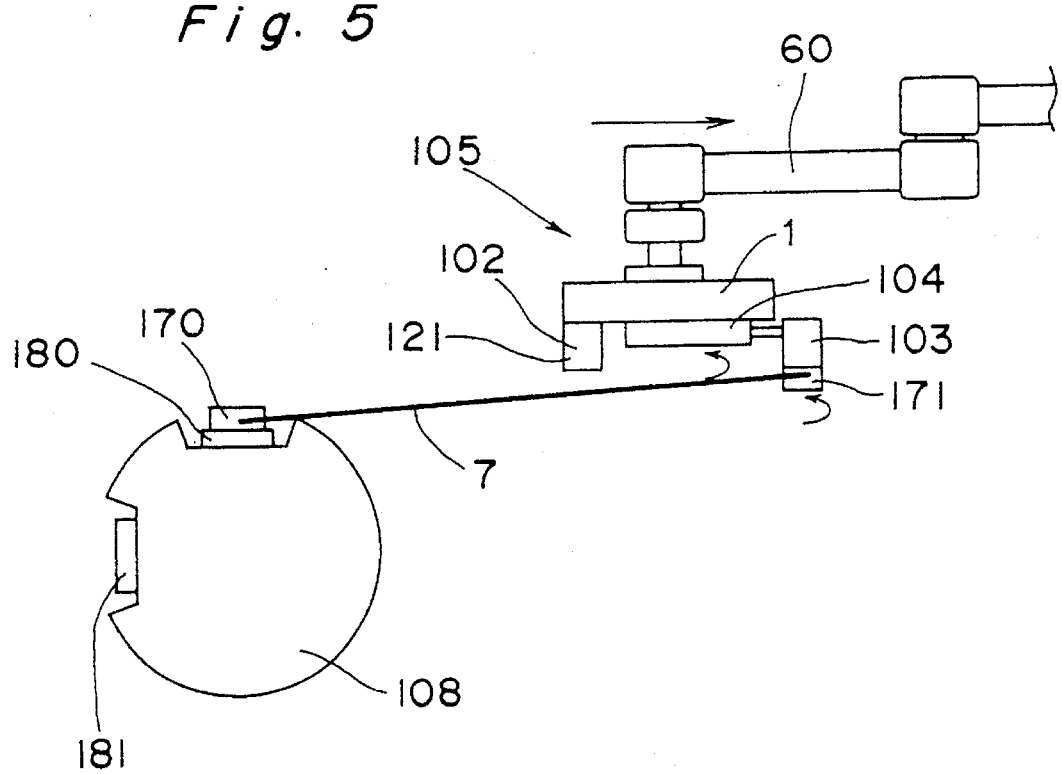
FIG. 5 is a diagram illustrating an elastic plate automatic mounting/dismounting device of the thin-film forming apparatus.

In this state, by driving the arms 60 of the articulated robot 6, the hand 105 is separated from the barrel 108 of the printing roll to apply a predetermined tension to the elastic plate 7 between the first elastic plate holder 170 and the second elastic plate holder 171 (see FIG. 5).

As the elastic plate 7 is stretched gradually due to the separation, the stretching force which acts upon the elastic plate 7 becomes large and the force by which the second elastic plate holder 171 is stretched with the elastic plate 7 becomes large. On the other hand, the air is supplied to the air cylinder 141 with such an air pressure that the rod 142 goes back into the air cylinder 141 by a proper amount by the tension applied to the elastic plate 7. Accordingly, when a tension not less than a proper amount is applied to the elastic plate 7, the rod 142 goes back into the air cylinder 141 in correspondence with the tension to correspondingly reduce the tension applied to the elastic plate 7. Thus, a constant tension is applied to the elastic plate 7. As is apparent from the above description, the magnitude of the tension applied to the elastic plate 7 can be controlled by means of the pressure value of the air supplied to the air cylinder 141. The proper amount of tension described above means a tension which has such a proper magnitude that no excessive tension is applied to the elastic plate 7 and there is no slackening in the whole elastic plate 7 or a part thereof.

Also, as shown in FIG. 12, in the case where there is caused slackening as illustrated in the elastic plate 7 if the elastic plate 7 is not in the state that the first elastic plate holder 170 and the second elastic plate holder 171 thereof are not parallel, that is, in the state of, so called, a slant shift, the chuck body 131 rotates on the right or the left by the amount of the above slant shift, centering around the rotary center 133 of the stretching chuck means with respect to the bearing body 143, and thus the second elastic plate holder 171 tilts, and the slackening in a part of the elastic plate 7 is removed to stretch the elastic plate 7 tautly (see FIG. 13).

Figure 14:
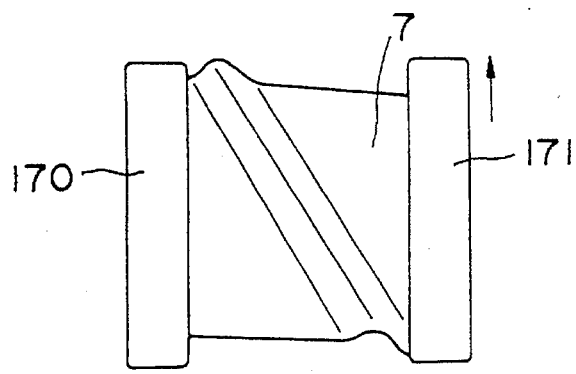
FIG. 14 is a diagram illustrating the state of the elastic plate at the time of mounting thereof, in the conventional thin-film forming method.
Figure 15:
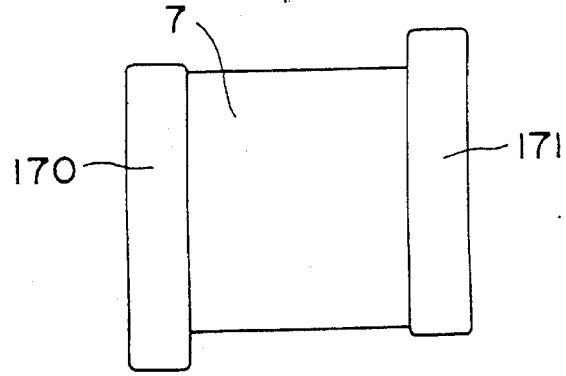
FIG. 15 is a diagram illustrating the state of the elastic plate which is stretched taut so that there is no slackening, in the embodiment of the thin-film forming method according to the present invention.

Or, as shown in FIG. 14, in the case where there is caused such slackening as illustrated in a part of the elastic plate 7 if the elastic plate is not in the state that the second elastic plate holder 171 is not located in the front of the first elastic plate holder 170, that is, in the state of, so called, a parallel shift, the mounting means 140 is rotated on the left by the necessary angle, centering around the rotary center 162 of the mounting means 140 with respect to the hand body 1, and the chuck body 131 is rotated on the right by the necessary angle, centering around the rotary center 133 of the stretching chuck means with respect to the bearing body 143. Thus the first elastic plate holder 170 and the second elastic plate holder 171 are made parallel, and the slackening in a part of the elastic plate 7 is removed to stretch the elastic plate 7 tautly (see FIG. 10 and FIG. 15).

Thus, the state that there is no excessive tension or slackening caused in the elastic plate 7 is brought before the elastic plate 7 is wound round the barrel 108 of the printing roll.

Figure 6:
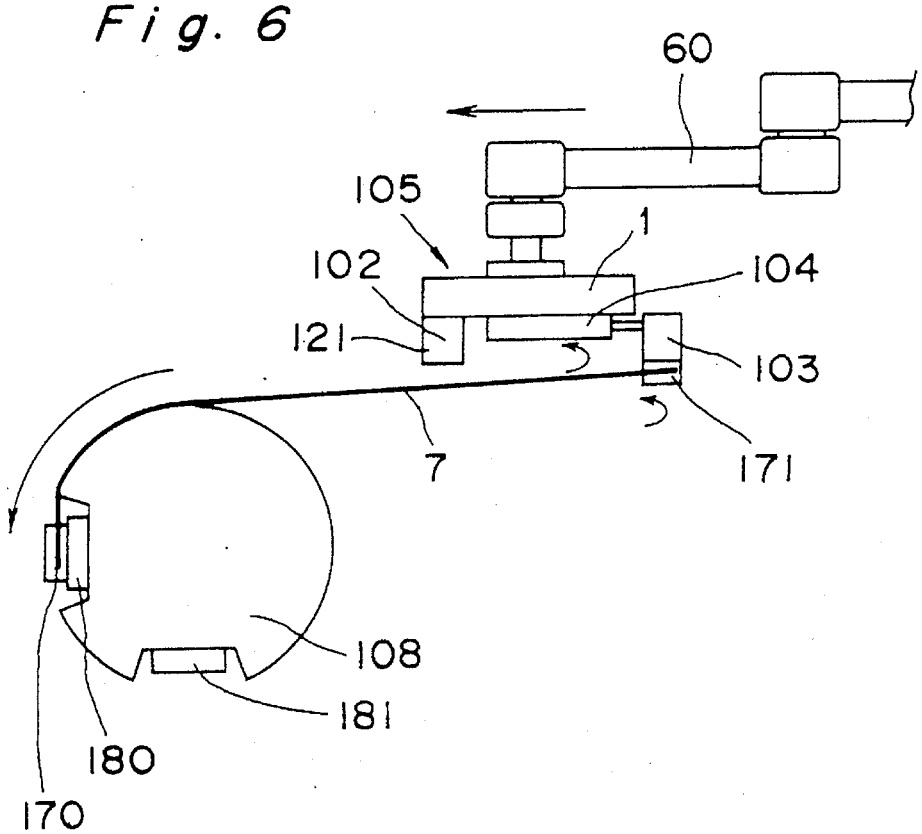
FIG. 6 is a diagram illustrating an elastic plate automatic mounting/dismounting device of the thin-film forming apparatus.
Figure 7:
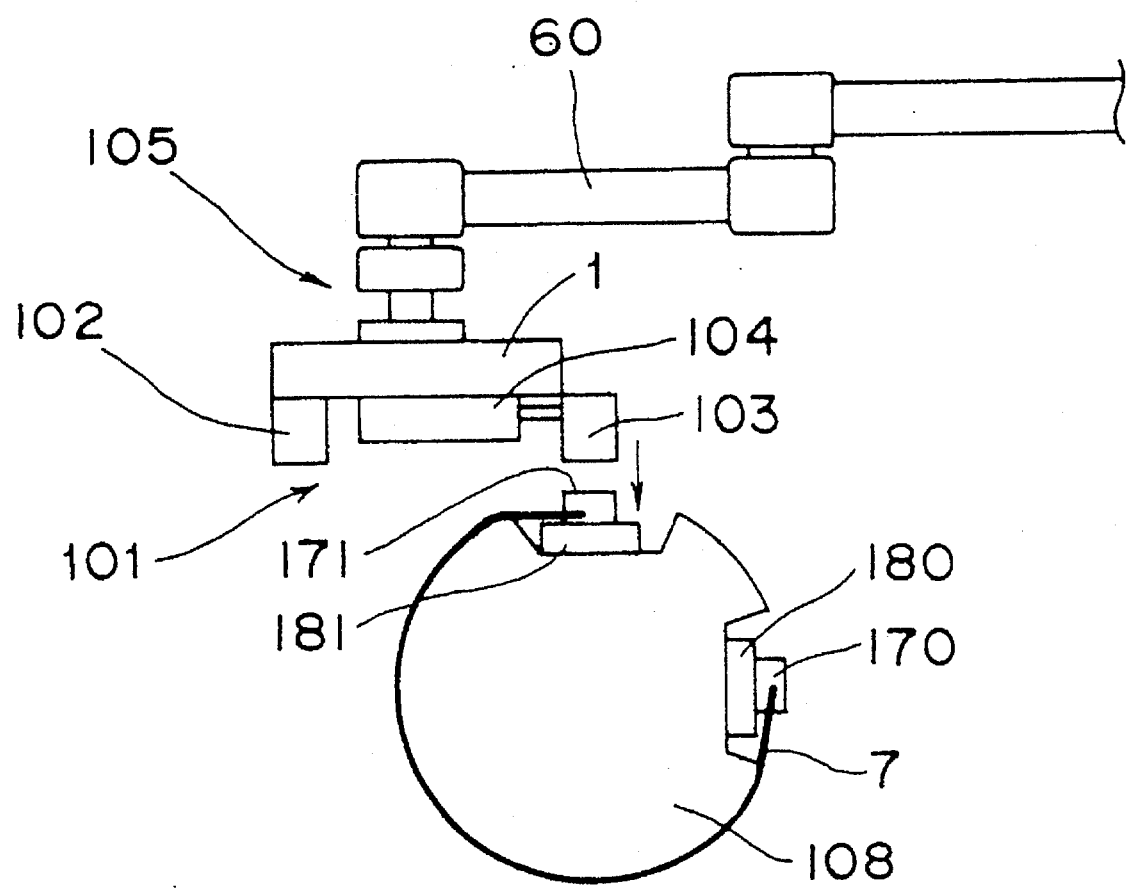
FIG. 7 is a diagram illustrating an elastic plate automatic mounting/dismounting device of the thin-film forming apparatus.

Then, the barrel 108 of the printing roll is gradually rotated in the direction of winding the elastic plate 7, the arm 60 of the articulated robot 6 is driven, the hand 105 is brought gradually close to the barrel 108 of the printing roll, and the second elastic plate holder 171 of the elastic plate 7 is moved to the position where the second chuck means 181 of the barrel 108 of the printing roll is provided (see FIGS. 6 and 7, and step 3 and step 4 of FIG. 18). The tension applied to the elastic plate 7, as described above, is adjusted automatically by back and forth movement of the rod 142 of the air cylinder 141. The back and forth movement of the rod 142 is carried out, while the elastic plate 7 is wound round the barrel 108 of the printing roll, when the excessive tension is applied to the whole elastic plate 7 by the movement of the hand 105 which is a little slower than the rotation of the barrel 108 of the printing roll, or when the shortage of the tension is caused on the whole elastic plate 7 by the movement of the hand 105 which is a little faster than the rotation of the barrel 108 of the printing roll. In the former case, since the rod 142 goes back to the air cylinder 141 to ease the excessive tension, a predetermined tension is maintained while the elastic plate 7 is being wound. In the latter case, since the rod 142 advances from the air cylinder 141 to reduce the shortage of tension on the elastic plate 7, a predetermined tension is maintained while the elastic plate is being wound.

Furthermore, when the elastic plate 7 is wound round the barrel 108 of the printing roll, as well as the state that a predetermined tension is applied to the elastic plate 7 is maintained, there may be a case where the stretching direction of the elastic plate 7 is adjusted by the rotation of the mounting means 140 and/or the chuck body 131, as described above (see FIG. 10).

Then, the second elastic plate holder 171 of the elastic plate 7 is transferred from the stretching chuck means 103 of the hand 105 to the second chuck means 181 of the barrel 108 of the printing roll, and the mounting of the elastic plate 7 to the barrel 108 of the printing roll is completed (see FIG. 7). This transfer is performed by excitation and demagnetization of the electromagnets provided on the stretching chuck means 103 and the second chuck means 181, in the case where, for example, magnetic force-type holding mechanisms are adopted as the stretching chuck means 103 and the second chuck means 181.

Thus, after the elastic plate 7 is mounted round the barrel 108 of the printing roll, a thin-film is formed on the to-be-printed material by the printing device. Namely, the ink is first supplied to the surface of the intaglio roll A by the ink supply nozzle B1 which reciprocatingly moves in the longitudinal direction of the intaglio roll A, and then the scraping-off unnecessary ink is carried out by the doctor blade B2 to fill the ink into the ink cells and measure the filled ink amount.

When the printing table D is moved from the position "a" for putting a to-be-printed material to the carry-out position "c", after the to-be-printed material D2 is put on the printing table D, the printing table D slidingly moves with the rack D3, and at the same time, the printing roll C and the intaglio roll A rotate while interlocking with the rotation of the driving shaft of the printing table. Namely, the printing table D moves to the carry-out position "c" via the printing position "b", synchronously with the rotation of the printing roll C. At this time, the ink on the intaglio roll A is transferred to the convex portion of the elastic plate 7 of the printing roll C, and further transferred to the to-be-printed material D2.

On the contrary, when the printing table D is moved from the carry-out position "c" to the position "a" for putting a to-be-printed material, the interlock of the rotation of the printing roll C with the slide movement of the printing table D is cut off by a clutch device and the like, and the printing table D is moved from the carry-out position "c" via the printing position "b" to the position "a" for putting a to-be-printed material, regardless of the rotation of the printing roll C.

The elastic plate automatic dismounting method in the present embodiment will now be described.

The elastic plate automatic dismounting method is a method that after the elastic plate 7 mounted to the barrel 108 of the printing roll by the elastic plate automatic mounting method is used to print the to-be-printed material, the first elastic plate holder 170 and the second elastic plate holder 171 transfer the elastic plate 7 fixed by the first chuck means 180 and the second chuck means 181 of the barrel 108 of the printing roll, respectively, to the hand 105.

First, from the second chuck means 181 of the barrel 108 of the printing roll around which the elastic plate is wound, the second elastic plate holder 171 of the elastic plate 7 is transferred to the stretching chuck means 103 of the hand 105. The operation to transfer the second elastic plate holder 171 from the second chuck means 181 to the stretching chuck means 103 is carried out by excitation of demagnetization of the electromagnets provided in the stretching chuck means 103 and the second chuck means 181, in the case where the stretching chuck means 103 and the second chuck means 181 adopt, for example, a magnetic force-type holding mechanisms.

Then, as well as the barrel 108 of the printing roll is rotated in the direction that the elastic plate 7 is come off, the arms 60 of the articulated robot 6 are driven to fit the positions of the fixed chuck means 102 of the hand 105 and the first elastic plate holder 170 of the elastic plate 7 to each other, then the first elastic plate holder 170 of the elastic plate 7 is transferred from the first chuck means 180 of the barrel 108 of the printing roll to the fixed chuck means 102 of the hand 105, and thus dismounting of the elastic plate 7 from the barrel 108 of the printing roll is completed.

The thin-film forming apparatus and the thin-film forming method of the present invention have the effects described below by means of the above-mentioned structure and operations:

(1) Since the printing is carried out after the elastic plate is automatically exchanged with another one to the barrel of the printing roll by a hand mounted to a articulated robot, the efficiency of forming a thin-film can be improved by saving time and trouble.

(2) Since operators do not have to go in and out in order to mount the elastic plate to the barrel of the printing roll, dust is reduced and the cleanliness of the area can be improved. Furthermore, since the elastic plate is held automatically by the hand of the articulated robot, dust and dirt do not attach to the elastic plate. Accordingly, the elastic plate does not got dirty at all.

Therefore, when the ink is transferred from the intaglio roll to the elastic plate, printing can be carried out to the to-be-printed material with pure ink having a fixed property. For example, in the case of printing of a macromolecular thin-film such as a liquid crystal orientation film, the insulating property and the orientation is excellent, and part of a film is not missing.

(3) Since the elastic plate is wound round the barrel of the printing roll while automatically adjusting the tension applied to the elastic plate by a hand mounted to a robot, such a state that a tension is applied over the whole width of the elastic plate with a predetermined magnitude and in a predetermined direction can be easily maintained while the elastic plate is wound round the barrel of the printing roll. Therefore, the elastic plate can be wound round the barrel of the printing roll without causing any excessive tension or slackening, and the elastic plate can be mounted to the barrel of the printing roll in the state that there is no wrinkles or waves.

Therefore, the contact pressure of the intaglio roll and the elastic plate, and the contact pressure of the elastic plate and the to-be-printed material become constant. Thereby, an uniform thin-film can be formed on the to-be-printed material without consuming any time, and the efficiency of forming a thin-film can be improved.

The second embodiment of the present invention will now be described below with reference to the drawings.

The summary of the thin-film forming apparatus and the thin-film forming method in accordance with the second embodiment is described below.

In the thin-film forming apparatus and the thin-film forming method of the second embodiment, wiping and drying of the intaglio roll is automatically carried out by using a hand mounted on the arm of the articulated robot in the intaglio roll automatic wiping device. Accordingly, before or after the printing process carried out at the printing device, the intaglio roll can be automatically wiped or dried, and the series of processes of the thin-film forming can be smoothly carried out to improve the efficiency of the thin-film forming.

Furthermore, in the thin-film forming apparatus and the thin-film forming method of the present invention, wipers can be always pressed to the barrel surface of the intaglio roll with a predetermined contact pressure, by the repulsion-pressing means of the intaglio roll automatic wiping device. Therefore, wiping and/or drying of the intaglio roll can be sufficiently and uniformly carried out, and thus foreign substance cannot be mixed in the thin-film, and a thin-film having an uniform film thickness can be formed.

First, the intaglio roll automatic wiping device of the thin-film forming apparatus of the second embodiment is described below. The repulsion-pressing means 203 corresponds to the pressing means described in the claims, and the repulsive force generating member 230 corresponds to the pushing force generating member described in the claims.

Figure 19:
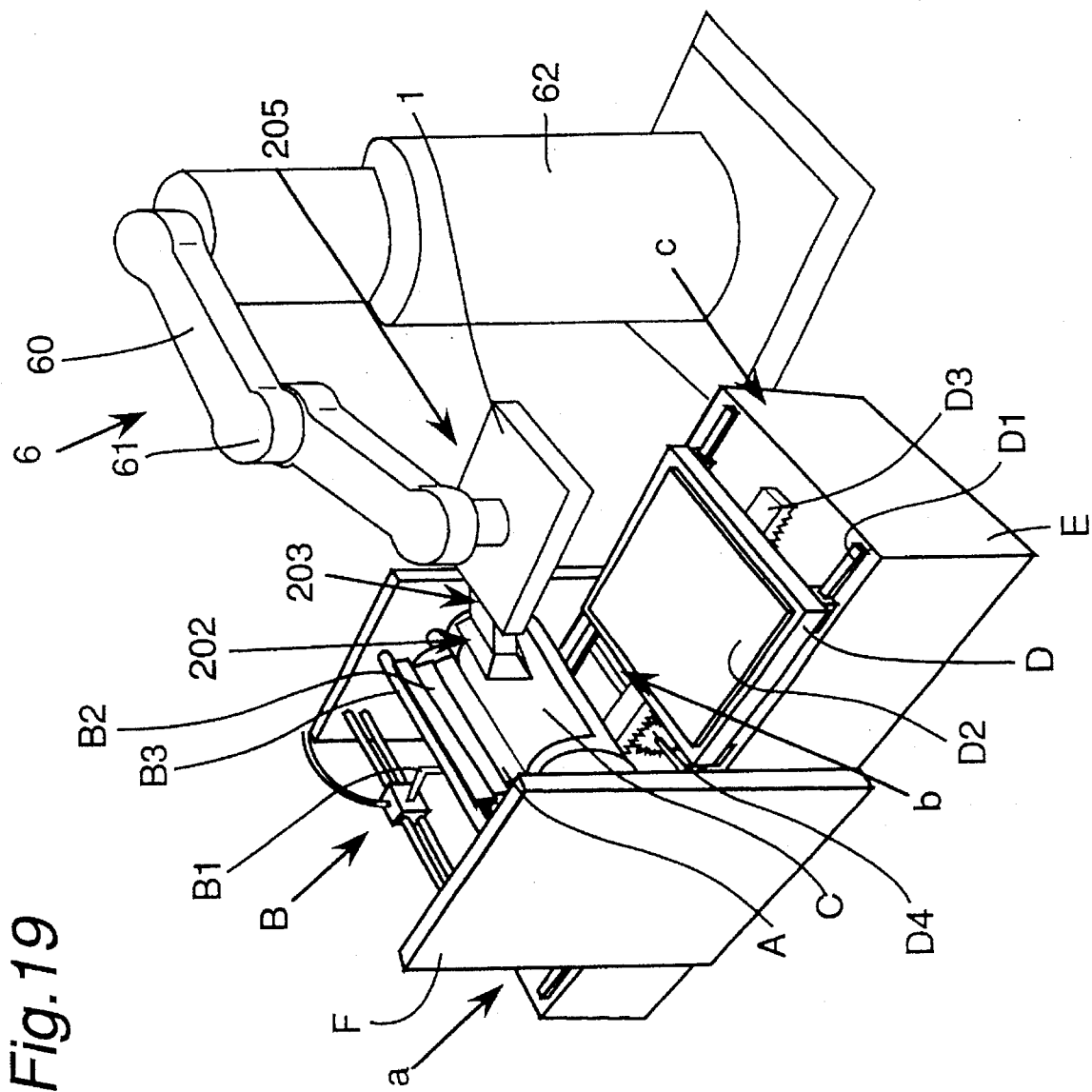
FIG. 19 is a perspective view showing the second embodiment of the thin-film forming apparatus of the present invention.
Figure 20:
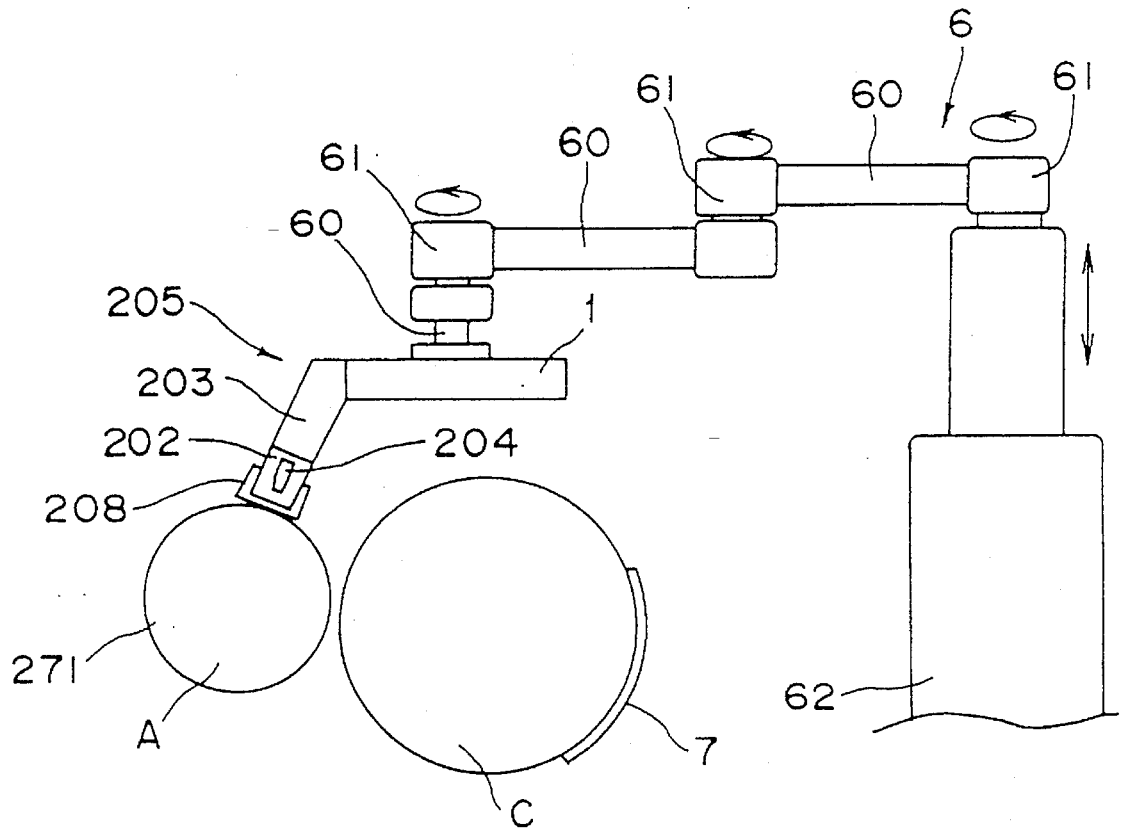
FIG. 20 is a diagram illustrating the automatic wiping device for the intaglio roll of the thin-film forming apparatus according to the second embodiment.

In the intaglio roll automatic wiping device, as shown in FIG. 19 and FIG. 20, a hand 205 comprising a hand body 1 and a wiper holder means 202 for wiping the intaglio roll, mounted via a repulsion-pressing means 203 to one end of the hand body 1, is mounted to the arm 60 of the articulated robot 6.

The articulated robot 6 is the same as the one described in the first embodiment.

Figure 22:
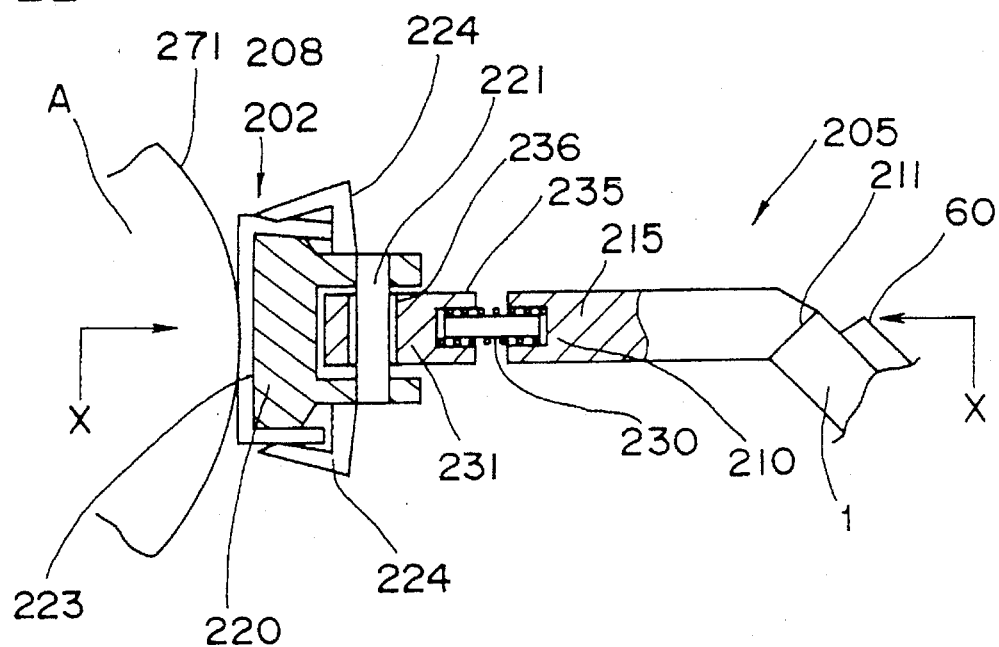
FIG. 22 is an enlarged sectional diagram of the main part of a variation of the automatic wiping device for the intaglio roll.
Figure 23:
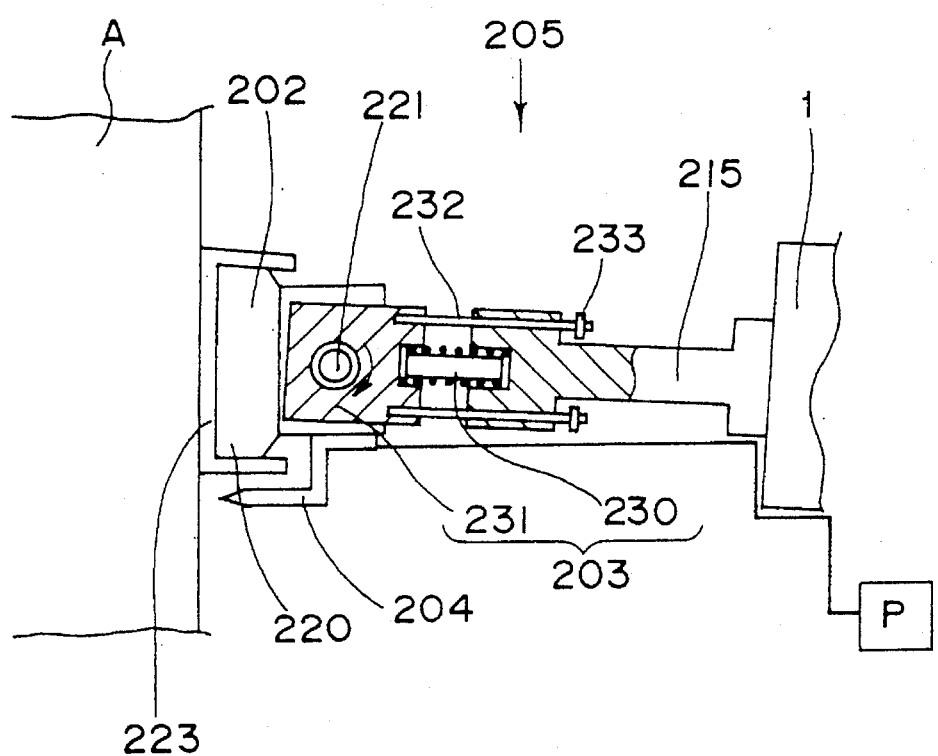
FIG. 23 is a sectional view taken along the line X—X of FIG. 22.

The hand body 1 is, like in the first embodiment described above, a rectangular plate, and the arm 60 of the articulated robot 6 is fixed in the roughly center of the surface thereof, and the hand 205 can be freely moved in the optional directions by the driving of the arm 60 of the articulated robot 6 (see FIGS. 19 and 20). The hand 205 is, as shown in FIGS. 22 and 23, an arm-like member fixed at one side of the hand body 1, and includes a mounting body 215 which is the part mounted to the hand body 1, a repulsion-pressing means 203 provided at the end of the mounting body 215, and a wiper holder means 202 mounted at the end of the repulsion-pressing means 203.

The wiper holder means 202 includes a plate-shaped wiper mounting portion 220, and a rotation shaft 221 rotatably engaged with a bearing body 231 of the repulsion-pressing means 203 described below. The wiper mounting portion 220 has a pressing face 223 of the wiper 208. The rotation shaft 221 is fitted into the bearing part 236 of the bearing body 231, and the wiper holder means 202 rotates centering around the rotation shaft 221 with respect to the bearing body 31.

On the wiper mounting portion 220, a wiper chuck 224 is projected for holding the wiper 208 at the pressing face 223 or releasing the hold. The wiper chuck 224 is composed of, for example, resin materials, and holds the wiper 208 at the pressing face 223 by the elastic force thereof. The pressing face may be a plane, or a curved face along the curved face of the barrel surface 271 of the intaglio roll A. Also, as a wiper 208, there is used non-woven fabrics into which solvent for dissolving the ink is saturated.

Furthermore, the wiper holder means 202 repels the hand body 1 with each other, via the repulsion-pressing means 203 described later, and presses the wiper 208 against the barrel surface 172 of the intaglio roll A with a predetermined contact pressure (see FIG. 20, FIG. 22, and FIG. 23).

The repulsion-pressing means 203 has, as shown FIGS. 22 and 23, a repulsive force generating member 230 which generates a repulsive force, such as a spring or an air cylinder (not shown), in order to generate a repulsive force between the hand body 1 and the wiper holder means 202. By this repulsive force, the wiper holder means 202 is pressed against the barrel surface of the intaglio roll A with a predetermined contact pressure.

In the present embodiment, the repulsion-pressing means 203 includes a mounting body 215, whose one end is fixed to the hand body 1, a bearing body 231 located at the other end of the mounting body 215, and a repulsive force generating member 230 which generates a repulsive force between the mounting body 215 and the bearing body 231. As the repulsive force generating member 230, a spring is used in the present embodiment, and respective ends of the spring are held by the concave receiving portion 210 provided at the other end of the mounting body 215 and the concave receiving portion 235 provided in the bearing body 231, respectively. Also, the movement of the bearing body 231 relative to the mounting body 215 is guided by the guide rod 232, whose one end is buried in the bearing body 231 and whose other end is slidably held in the mounting body 215. A stopper 233 is provided to the guide rod 232 so that the mounting body 215 and the bearing body 231 are not parted due to the repulsive force of the spring, and thus there is a limit in parting the mounting body 215 and the bearing body 231.

Furthermore, to the hand 205, as illustrated, a gas-ejecting means 204 which ejects gas for drying the intaglio roll from, e.g., a pump, may be provided side by side with the wiper holder means 202. As the gas for drying the intaglio roll, there can be mentioned nitrogen gas. The gas ejecting means 204 is a gas ejecting means such as a nozzle, and is mounted on the side of the wiper holder means 202.

In another portion of the hand body 1 where the wiper holder means 202 for wiping the intaglio roll is mounted via a repulsion-pressing means 203, the elastic plate automatic mounting/dismounting means 101 and/or the wiper holder means 302 for wiping the doctor blade may be mounted (not shown).

Figure 24:
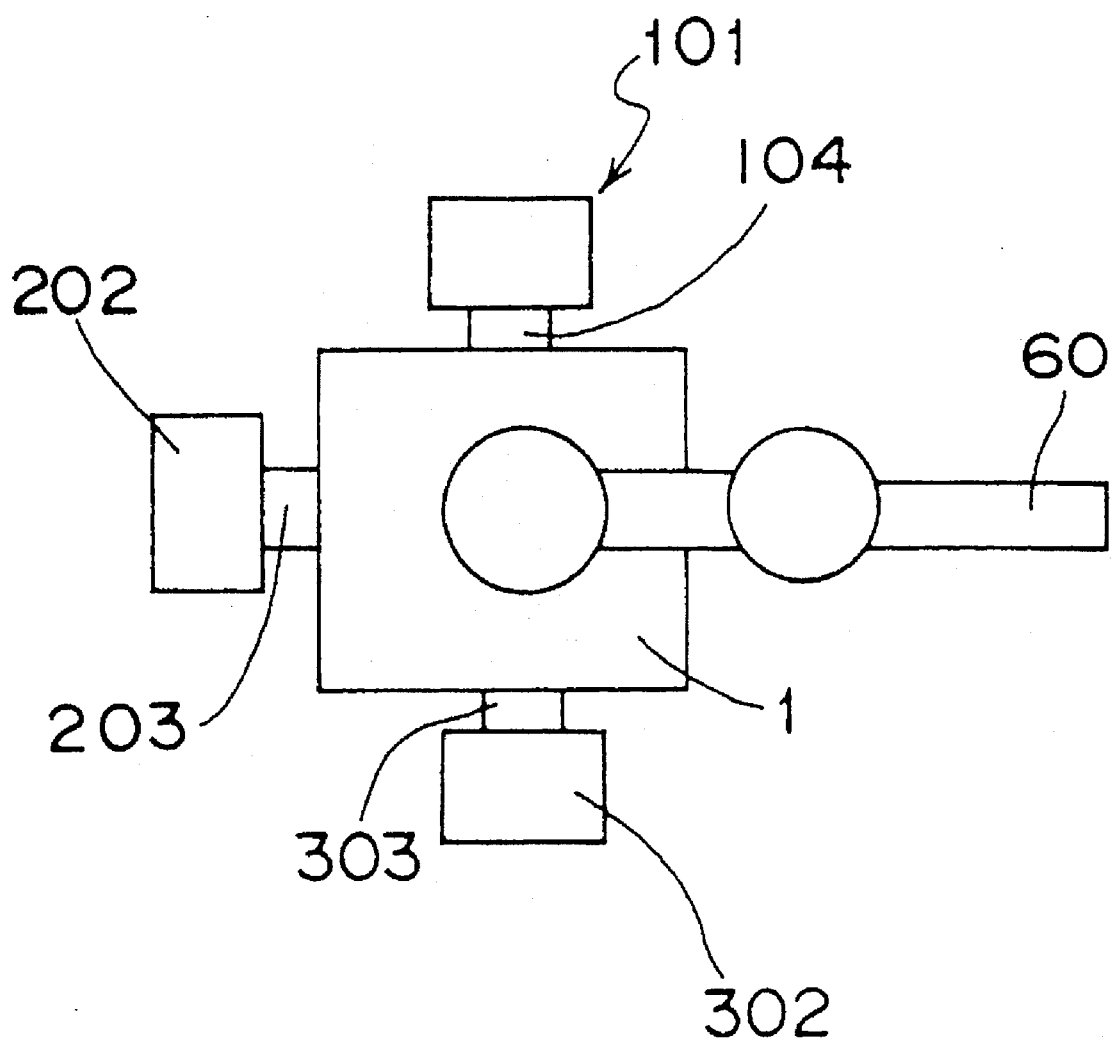
FIG. 24 is a diagram showing the state that an elastic plate automatic mounting/dismounting means and a wiper holder means for wiping the doctor blade are mounted to the automatic wiping device for the intaglio roll.

The elastic plate automatic mounting/dismounting means 101 has the mechanism described in the above-mentioned first embodiment, and as shown in FIG. 24, has the elastic plate tension-adjusting means 104 to be mounted to the hand body 1.

Furthermore, the wiper holder means 302 for wiping the doctor blade is mounted, for example, as shown in FIG. 24, to the hand body 1 via a repulsion-pressing means 303, at a position opposite to the elastic plate automatic mounting/dismounting means 101. When it is necessary to remove the unnecessary ink which is left in the doctor blade, a wiper composed of non-woven fabrics or the like which has been saturated with solvent is held by the wiper holder means 302 for the doctor blade, and the surface of the doctor blade is wiped by the wiper by rotating the hand body 1 by 90 degree and driving the arms 60 of the articulated robot 6. The repulsion-pressing means 303 is a means which utilizes the repulsive force of a spring, an air cylinder, or the like to bring the wiper into contact with the tip of the doctor blade with a predetermined contact pressure and to hold the upper and lower faces of the doctor blade with the wiper with a predetermined catching pressure.

One embodiment of the thin-film forming method according to the present invention is described below.

First, by the intaglio roll automatic wiping device, the barrel surface 271 of the intaglio roll A to which unnecessary ink is adhered is wiped by the wiper 208 to remove the unnecessary ink automatically.

The intaglio roll A is a columnar ceramic body or a columnar metal body having a rotation shaft 270, and has a plurality of ink cells provided on the barrel surface 271 thereof. Ink goes into the ink cells, and the ink in the ink cells is transferred to the surface of the printing roll C which is disposed abutting to the barrel of the intaglio roll A.

First, the wiper 208 is held in the pressing face 223 of the wiper holder means 202 of the intaglio roll automatic wiping device. For example, the wiper 208 may be fixed with plural wiper chucks 224 mounted to the side of the wiper mounting portion 220 of the wiper holder means 202. As the wiper 208, there can be used non-woven fabrics saturated with liquid such as the prime solvent of the ink, alcohol, acetone, or the like, or dried non-woven fabrics into which nothing is saturated.

Then, by driving the arms 60 of the articulated robot 6, the wiper holder means 202 is moved and the pressing face 223 of the wiper 208 is pressed against the barrel surface 271 of the intaglio roll A with a predetermined contact pressure.

The driving of the arms 60 may be done by properly bending/stretching the arms 60 via the joints 61 of the articulated robot 6 or by vertically moving the robot base 62.

The predetermined contact pressure means such a pressure, when the wiper 208 is brought into contact with the barrel surface 271 of the intaglio roll A, that the solvent saturated in the wiper 208 can sufficiently dissolve the unnecessary ink which has gone into the ink cells of the barrel surface 271. of the intaglio roll A and the dissolved ink can be completely wiped out by the wiper 208 due to the rotation of the intaglio roll A.

Then, while the intaglio roll A is rotated and the contact pressure of the wiper 208 against the barrel surface 271 of the intaglio roll A is maintained, the arms 60 of the articulated robot 6 are driven to move the hand 205 along the axial direction of the intaglio roll A.

When the curvature of the barrel surface 271 of the intaglio roll A is large and the wiper 208 held by the wiper holder means 202 is plane, the barrel surface 271 of the intaglio roll A and the wiper 208 come into line contact, and other parts of the wiper 208 are separated from the barrel surface 271 and do not contact each other. If it is tried to press strongly the wiper 208 against the barrel surface of the intaglio roll A so as to contact the whole face of the wiper 208 with the barrel surface 271, there are produced parts pressed with a strong contact pressure and parts pressed with a weak contact pressure. It means that the ink is wiped out only by the part which is brought into line contact or the part having the maximum contact pressure, and parts where much dirt is adhered and parts where dirt is less adhered are produced, and the whole face of the wiper cannot be effectively used so as to deteriorate the wiping efficiency.

Figure 21:
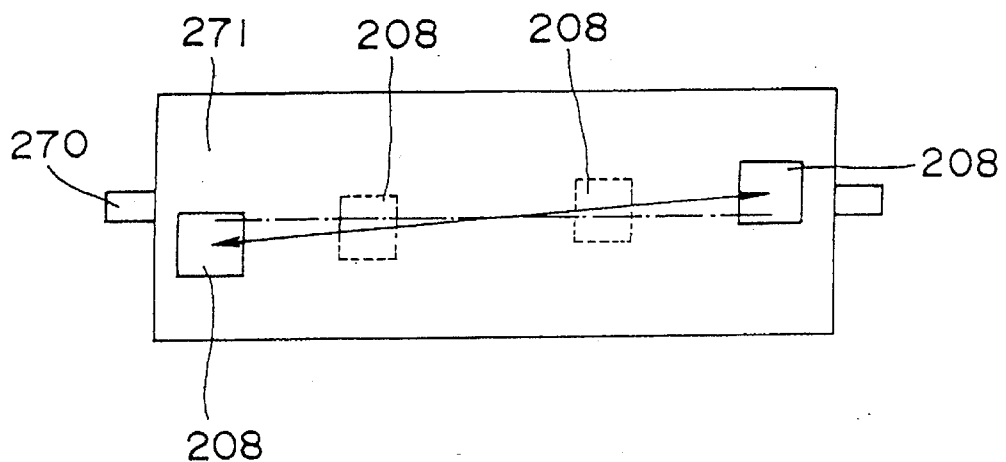
FIG. 21 is a diagram illustrating the tracks of the wiper holder means of the automatic wiping device for the intaglio roll, which moves keeping contact with the barrel surface of the intaglio roll.

In such a case, as shown in FIG. 21, it will be better to move the hand 205 in a direction with a certain angle against the axial direction. By such a manner, the part where the wiper 208 and the intaglio roll A are brought into line contact or the part where the contact pressure becomes maximum moves on the whole surface of the wiper 208 evenly, and thus, the whole face of the wiper 208 can be effectively used to improve the wiping efficiency.

Furthermore, while wiping the barrel surface 271 of the rotating intaglio roll A with the wiper 208 and maintaining a predetermined contact pressure of the wiper 208 against the barrel surface 271 of the intaglio roll A, the angle between the bearing body 231 and the wiper holder means 202 may be adjusted (see FIG. 23).

The wiper holder means 202 can be rotated as required when the pressing face 223 of the wiper holder means 202 and the barrel surface 271 of the intaglio roll A are not made parallel and tend to be inclined against each other, due to a deviation of the hand 205, while moving the barrel of the intaglio roll A. Namely, if the pressing face 223 of the wiper holder means 202 inclines against the barrel surface 271 of the intaglio roll A, a part of the wiper 208 separates from the barrel surface 271 of the intaglio roll A, and it is difficult to bring the barrel surface 271 of the intaglio roll A into contact with the wiper 208 with an uniform contact pressure, and it is difficult to wipe it neatly. Therefore, according to the inclination thereof, by rotating the wiper holder means 202 by a predetermined angle centering around the rotation shaft 221, the pressing face 223 of the wiper holder means 202 is made parallel to the barrel surface 271 of the intaglio roll A, thereby the pressing face 223 of the wiper holder means 202 can be brought into contact with the barrel surface 271 of the intaglio roll A with an uniform contact pressure, without any space left therebetween.

Next, by driving the arms 60 of the articulated robot 6, the wiper 208 is parted from the barrel surface 271 of the intaglio roll A to complete wiping of the intaglio roll A.

Next, the automatic drying method after wiping the intaglio roll is described.

First, by driving the arms 60 of the articulated robot 6, the hand 205 is moved, so that a predetermined distance is disposed from the barrel surface 271 of the intaglio roll A, and the gas ejecting means 204 is moved for drying the intaglio roll automatic wiping device according to the second embodiment.

The driving of the arms 60 may be done by properly bending/stretching the arms 60 via the joints 61 of the articulated robot 6 or by vertically moving the robot base 62.

Then, while the intaglio roll A is rotated and gas is ejected from the gas ejecting means 204 for drying the intaglio roll A, the articulated robot 6 is driven to move the gas-ejecting means 204 along the axial direction of the intaglio roll A.

The intaglio roll A is rotated with a constant rotation velocity. The rotational velocity of the intaglio roll A is set depending upon the volume and temperature of the gas ejected from the gas-ejecting means 204 and the velocity of movement thereof in the axial direction of the intaglio roll A. For example, when the gas volume ejected from the gas-ejecting means 204 is large, or when the temperature thereof is high, or when the velocity of the movement of the gas-ejecting means 204 in the axial direction of the intaglio roll A is slow, it is better to make the rotation of the intaglio roll A relatively fast. Also, when the gas volume ejected from the gas-ejecting means 204 is small, or when the temperature thereof is low, or when the velocity of the movement of the gas-ejecting means 204 in the axial direction of the intaglio roll A is fast, it is better to make the rotation of the intaglio roll A relatively slow.

After the intaglio roll A is wiped out and dried, a thin-film is formed on the to-be-printed material by the printing device. This forming method is the same as that of the first embodiment, and therefore, the explanation thereof has been omitted.

The thin-film forming apparatus and the thin-film forming method of the present invention have the effects described below by means of the above-mentioned structure and operations:

(1) Since operators do not have to go in and out in order to wipe out the intaglio roll, dust is reduced and the cleanliness of the area can be improved. Furthermore, since the wiper is held automatically by the hand of the articulated robot, dust and dirt do not attach to the intaglio roll. Accordingly, the intaglio roll does not got dirty at all, as well as saving time and trouble, and thus, the wiping efficiency and the thin-film forming efficiency can be improved.

(2) Dust, dirt, and oils are not mixed in the ink. Therefore, for example, in the case of forming a macromolecular thin-film pattern such as a liquid crystal orientation film, the desired insulating property and orientation performance can be obtained in a thin-film, and then a thin-film having such high functions can be stably obtained.

(3) Since the wiping of the intaglio roll is carried out, while automatically pressing the wiper against the intaglio roll by the hand mounted to the arms of the articulated robot, the wiper can be pressed against the intaglio roll with a predetermined contact pressure. Also, while keeping the predetermined contact pressure, the arms can be moved automatically in the axial direction of the intaglio roll, and thus, the barrel surface of the intaglio roll can be wiped out uniformly.

Accordingly, the residual ink adhered into the ink cells can be sufficiently removed. Therefore, a thin-film having a sufficient film thickness can be formed on the to-be-printed material. The barrel surface of the intaglio roll can be also uniformly wiped out. Therefore, there is no unevenness caused in the transferred amount of the ink to the printing roll so as to make the film thickness uniform. Accordingly, for example, when a macromolecular thin-film pattern such as a liquid crystal orientation film is formed, such a thin-film having the high functions that has an uniform film thickness and no unevenness in the display can be stably obtained.

(4) Since the gas for drying the intaglio roll is ejected automatically to the barrel surface of the intaglio roll with the hand mounted to the articulated robot, it can be automatically and easily done to make the distance between the gas-ejecting means and the barrel surface of the intaglio roll a predetermined distance value and to maintain the predetermined distance while moving the gas-ejecting means in the axial direction of the intaglio roll. Therefore, the barrel surface of the intaglio roll can be dried uniformly, and the subsequent printing process can be smoothly carried out to improve the efficiency of the thin-film forming.

The third embodiment of the present invention will now be described with reference to the drawings.

The thin-film forming apparatus and the thin-film forming method in accordance with the third embodiment is described below.

In the thin-film forming apparatus and the thin-film forming method in the third embodiment, wiping and drying of the doctor blade is automatically carried out by using a hand mounted on the articulated robot at the doctor blade automatic wiping device. Accordingly, before or after the printing process carried out by the printing device, the doctor blade can be automatically wiped or dried, and the series of processes of the thin-film forming can be smoothly carried out to improve the efficiency of the thin-film forming.

Furthermore, since the tip of the doctor blade is brought into contact with the wiper with a predetermined contact pressure by using a repulsion-pressing means of the hand of the articulated robot, it can be prevented that the tip of the doctor blade and the wiper are parted from each other or they are contacted too strong to break the wiper. Therefore, wiping and/or drying of the doctor blade can be sufficiently and uniformly carried out, and thus, foreign substances cannot be mixed in the thin-film, and a thin-film having an uniform film thickness can be formed.

Furthermore, since the doctor blade is held with a upper chuck and a lower chuck with a predetermined holding pressure by means of the holding force-generating means, by using a wiper holder means of the hand of the articulated robot, the doctor blade can be always held by the wiper with a predetermined holding pressure. Therefore, wiping and/or drying of the doctor blade can be sufficiently and uniformly carried out, and thus, foreign substances cannot be mixed in the thin-film, and a thin-film having an uniform film thickness can be formed.

First, the doctor blade automatic wiping device of the thin-film forming apparatus of the third embodiment is described below. The repulsion-pressing means 303 corresponds to the pressing means described in the claims, and a air cylinder body 323 and a rod 361 corresponds to the driving means described in the claims.

Figure 25:
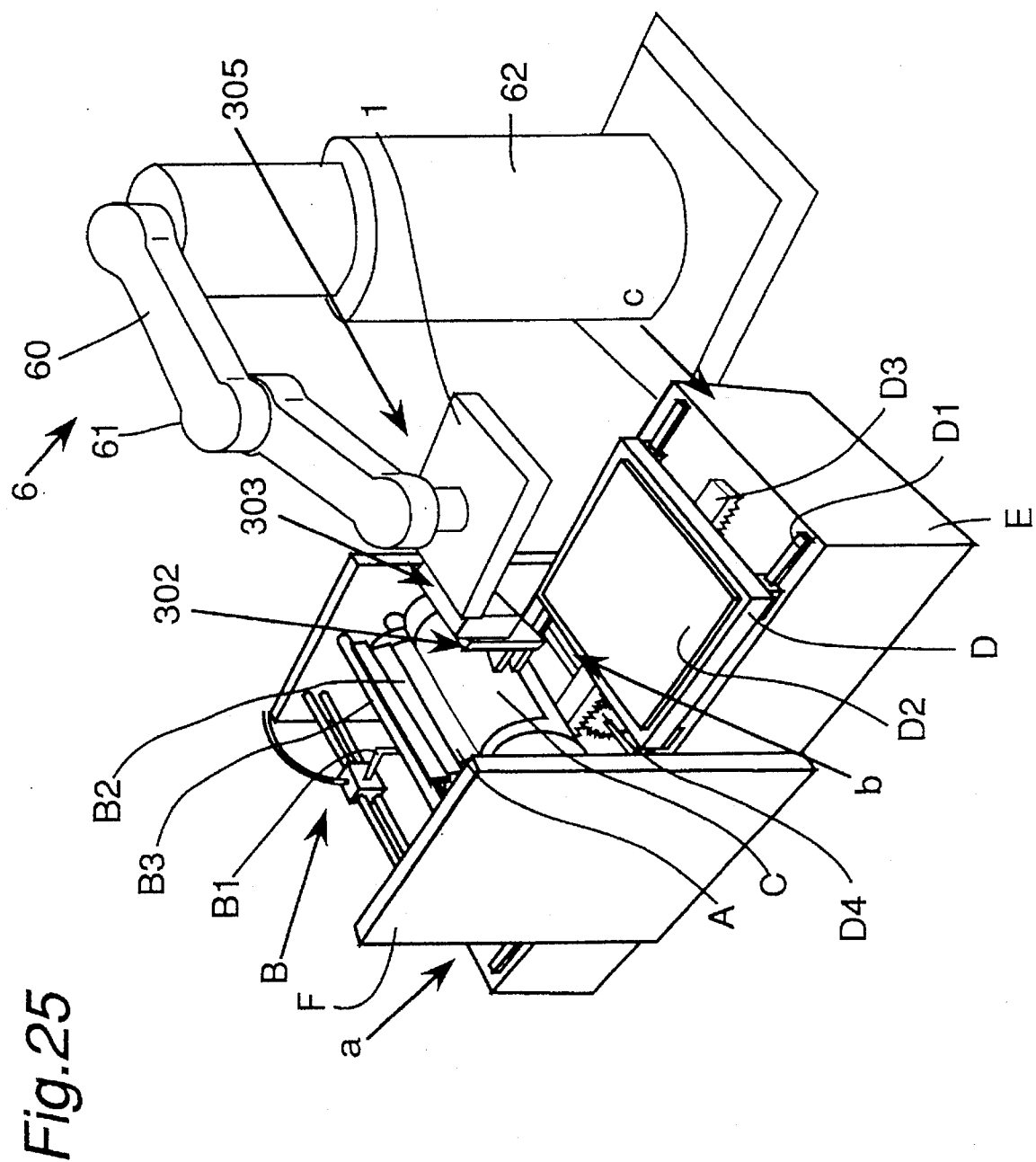
FIG. 25 is a perspective view showing the third embodiment of the thin-film forming apparatus of the present invention.
Figure 26:
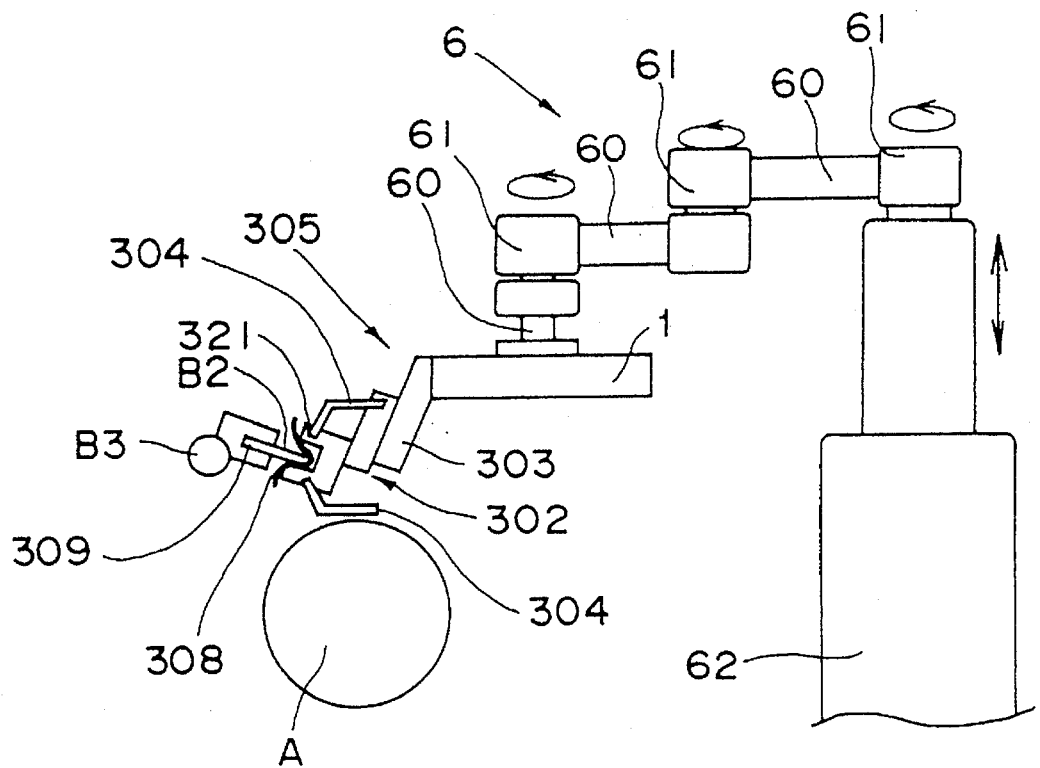
FIG. 26 is a side view illustrating the automatic wiping device for the doctor blade of the thin-film forming apparatus.

In the doctor blade automatic wiping device, as shown in FIG. 25 and FIG. 26, a hand 305 composed of the hand body 1 and the wiper holder means 302 for wiping the intaglio roll, mounted via the repulsion-pressing means 303 to one end of the hand body 1, is mounted to the arm 60 of the articulated robot 6. The hand body 1 and the articulated robot 6 are the same as those described in the above-mentioned embodiments.

The repulsion-pressing means 303 is composed of a means for generating a repulsive force or a tensile force, such as a spring 330 or an air cylinder (not shown), in order to generate a repulsive force between the hand body 1 and a wiper holder body 320 of the wiper holder means 302 described below. By this repulsive force or tensile force, the wiper holder means 302 is pressed against the doctor blade B2 with a predetermined contact pressure.

To put in concretely, in the present embodiment, the repulsion-pressing means 303 includes a rectangular plate-shaped mounting body 331 whose one end is fixed to one side of the hand body 1, two mounting rods 332 slidably piercing through the mounting body 331, and a spring 330 whose ends are respectively engaged with a hooking pin 333 fixed to the mounting body 331 and a hooking pin 334 fixed to one end of the mounting rods 332, and which urges the mounting rods 332 to the left direction in the drawing. Also, the other end of each mounting rods 332 is fixed to the back of the wiper holder body 320.

The wiper holder means 302 has a mechanism which can hold the wiper 308 or release the hold thereof by holding the wiper 308 by a chuck means 321. The wiper holder means 302 repels the hand body 1 with each other via a repulsion-pressing means 303, and presses the wiper 308 to the tip of the doctor blade B2 with a predetermined contact pressure (see FIG. 27 and FIG. 28). As the wiper 308, there can be used non-woven fabrics saturated with liquid such as the prime solvent of the ink, alcohol, acetone, or the like, or dried non-woven fabrics into which nothing is saturated.

Figure 28:
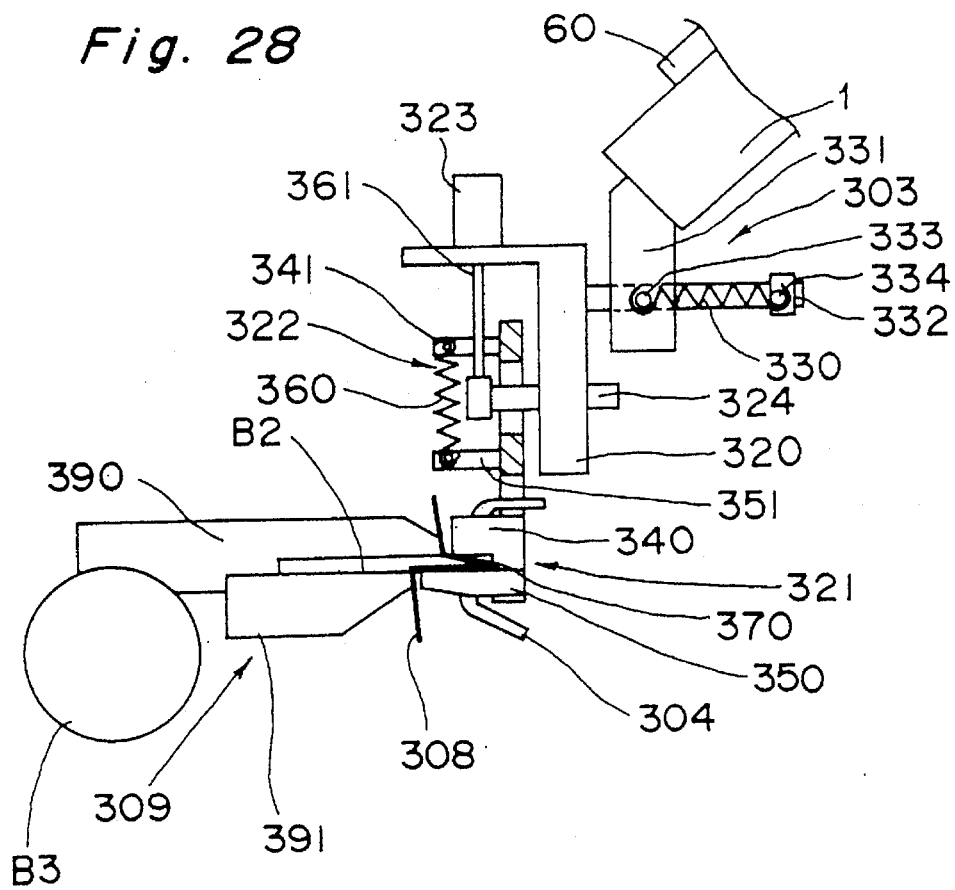
FIG. 28 is an enlarged side view showing the main part of a variation of the automatic wiping device for the doctor blade of the thin-film forming apparatus.
Figure 29:
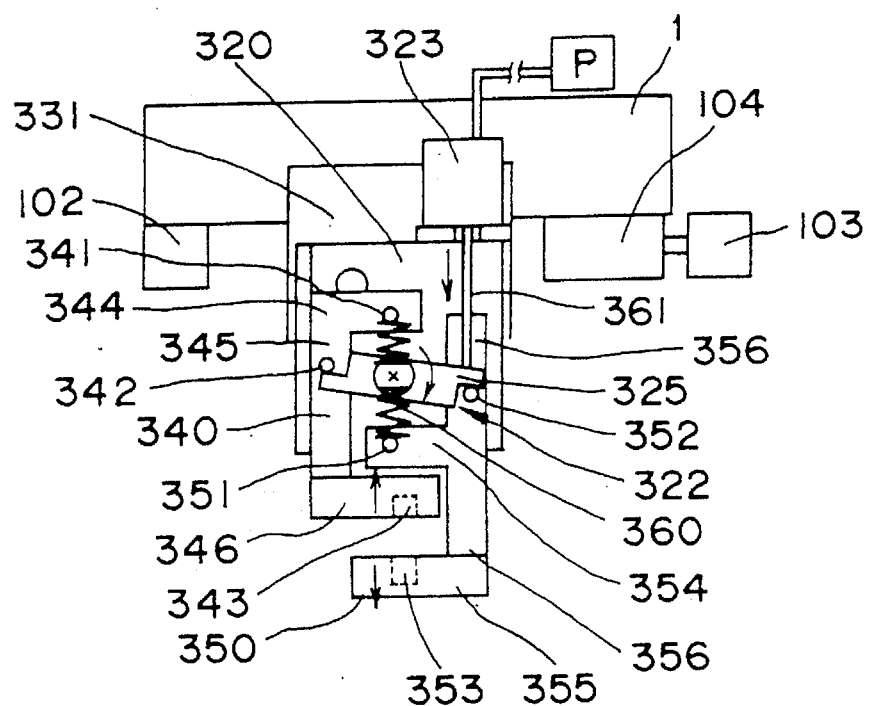
FIG. 29 is an elevational view showing the state that the upper chuck and the lower chuck of the automatic wiping device for the doctor blade shown in FIG. 28 are separated.

Concretely in the present embodiment, the wiper holder means 302 includes, as shown in FIGS. 28 and 29, a plate-shaped wiper holder body 320, an air cylinder body 323 which is fixed to a seat plate projected from the wiper holder body 320 and to which gas for driving is supplied from a gas supply source, the chuck means 321 having the upper chuck 340 and the lower chuck 350 which are slidably held in the front side of the wiper holder body 320, and a rotor 325 which is a plate-shaped body rotatably mounted to the end of the front side in the rotor shaft 324 piercing through the back to the front of the wiper holder body 320, and which abuts on a hooking pin 342 projecting from the upper chuck 340 and a hooking pin 352 projecting from the lower chuck 350.

Furthermore, the upper chuck 340 is of a C-shaped planar form composed of an upper portion 344, a lower portion 343, and a side portion 345 linking the upper portion 344 and the lower portion 343. A hooking pin 341 is projected from the upper portion 344, and the hooking pin 342 is projected from the side portion 345. The lower chuck 350 is of a reversed F-shaped planar form composed of an intermediate portion 354, a lower portion 355, and a side portion 356 linking the intermediate portion 354 and the lower portion 355. A hooking pin 351 is projected from the intermediate portion 354. These upper chuck 340 and lower chuck 350 move vertically in the opposite directions, respectively, relative to the wiper holder body 320.

With the hooking pin 341 and the hooking pin 351, is engaged respective ends of the spring 360 which constitutes a holding force generating means 322, and the lower portion 346 of the upper chuck 340 and the lower portion 355 of the lower chuck 350 are urged by the spring 360 so as to be pulled to each other to be close or contact with each other. Also, the tip of the rod 361 of the air cylinder body 323 abuts on one end of the rotor 325, and by the vertical movement of the rod 361, the action of increasing/decreasing a gap between the lower portion 346 of the upper chuck 340 and the lower portion 355 of the lower chuck 350 is performed. The lower portion 346 of the upper chuck 340 and the lower portion 355 of the lower chuck 350 hold the wiper 308 therebetween. The wiper 308 is also held in advance by the lower portion 346 and the lower portion 355. Also, the wiper 308 may be held by hooking in advance to the doctor blade B2.

Furthermore, as another embodiment of the holding force generating means 322, it may be constituted with an air cylinder.

The action relations between the rod 361 of the air cylinder, and the upper chuck 340 and the lower chuck 350 will now be described when the rod 361 of the air cylinder advances (in the lower direction in the drawing), the side portion of the rotor 325 is pushed to rotate the rotor 325 clockwise centering around the rotation shaft 324, and then the rotor 325 moves the whole upper chuck 350 downwards via the hooking pin 352 of the lower chuck 350 abutting on one end of the rotor 325. By the clockwise rotation of the rotor 325, the rotor 325 also moves the whole upper chuck 340 upwards via the hooking pin 342 of the upper chuck 340 abutting to the other end of the rotor 325. As a result, the lower portion 346 of the upper chuck 340 and the lower portion 355 of the lower chuck 350 part from each other to increase a gap formed between the lower surface of the lower portion 346 of the upper chuck 340 and the upper surface of the lower portion 355 of the lower chuck 350 (see FIG. 29).

On the contrary, when the rod 361 retreats (in the upper direction in the drawing) toward the air cylinder body 323 from the state that the increased gap between the upper chuck 340 and the lower chuck 350 is maintained, on the stage in the half way through the retreat, the hooking pin 341 of the upper chuck 340 and the hooking pin 351 of the lower chuck 350 are pulled to each other to be close to each other by the spring 360. As a result, the lower portion 346 of the upper chuck 340 and the lower portion 355 of the lower chuck 350 come close to decrease the gap between the upper chuck 340 and the lower chuck 350. Furthermore, when the rod 361 retreats toward the air cylinder body 323, a free state that an external force is not applied to the chuck means 321 is brought so that the chuck means 321 can slide vertically against the wiper holder body 320 while maintaining the state that the decreased gap between the upper chuck 340 and the lower chuck 350 is maintained (see FIG. 30).

A gas-ejecting means 304 for drying the doctor blade may be provided to the wiper holder means 302 of the hand 305.

As the gas for drying the doctor blade, there can be used nitrogen gas or the like. The gas-ejecting means 304 is a gas-ejecting device such as a nozzle and the like. A nozzle ejecting the gas downward and a nozzle ejecting the gas upward may be mounted integrally to the side of the wiper holder means 302 (see FIG. 27 and FIG. 30). Or gas-ejecting holes 343, 353 may be provided on the lower face of the lower portion 346 of the upper chuck 340 and on the upper face of the lower portion 355 of the lower chuck 350 of the chuck means 321 (see FIG. 29).

To another place of the hand body 1 where the wiper holder means 302 for wiping the doctor blade is mounted via the repulsion-pressing means 303, the elastic plate automatic mounting/dismounting means and/or the wiper holder means 202 for wiping the intaglio roll may be mounted.

Figure 30:
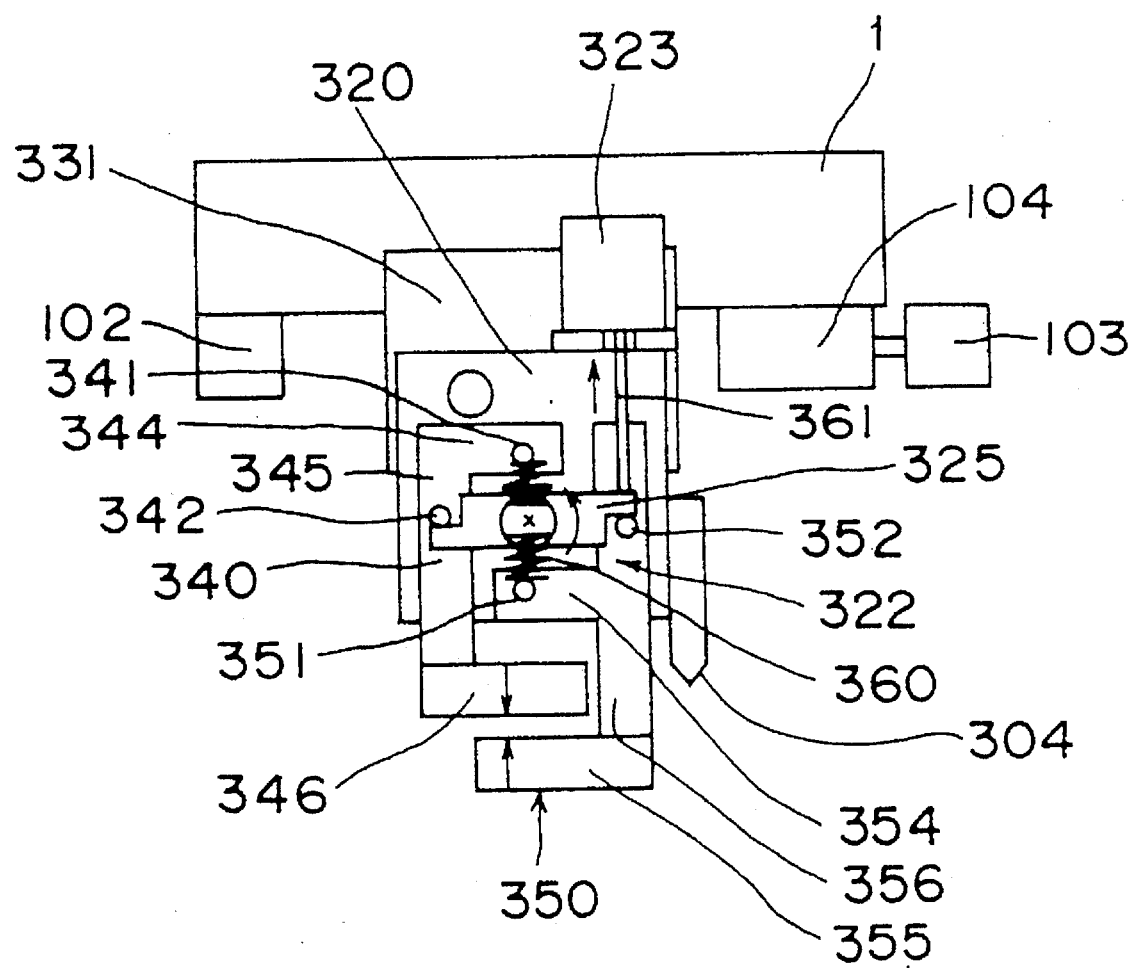
FIG. 30 is an elevational view showing the state that the upper chuck and the lower chuck of the automatic wiping device for the doctor blade shown in FIG. 28 are brought close.
Figure 31:
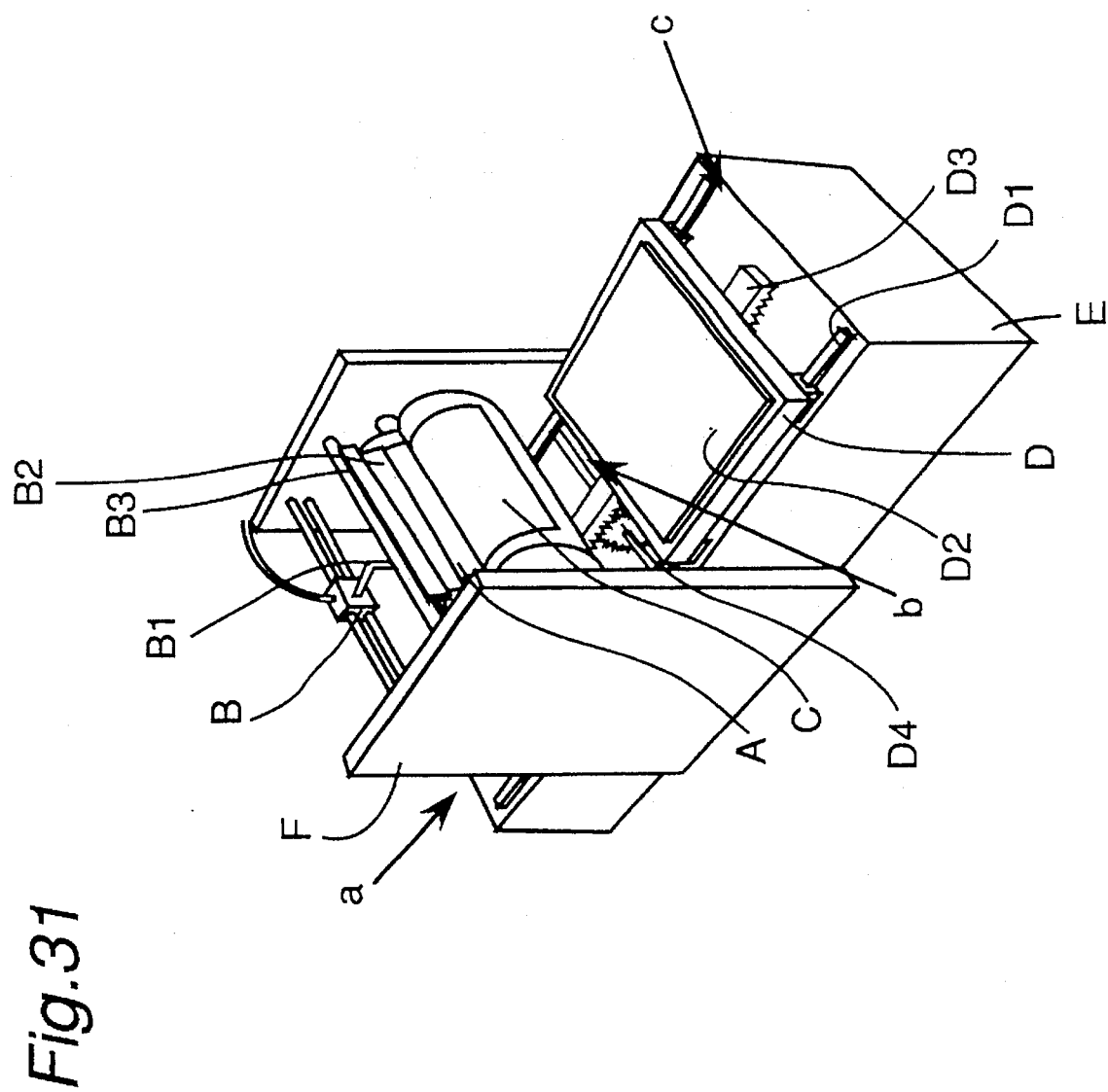
FIG. 31 is a view showing the conventional thin-film forming apparatus.

The elastic plate automatic mounting/dismounting means is that described in the above first embodiment, and composed of, for example, a fixed chuck means 102, a stretching chuck means 103, and the elastic plate tension-adjusting means 104, as shown in FIGS. 29 and 30, wherein the fixed chuck means 102 and the elastic plate tension-adjusting means 104 are fixed to the lower face of the hand body 1, and the gap between the stretching chuck means 103 and the hand body 1 is adjusted by the elastic plate tension-adjusting means 104.

Figure 27:
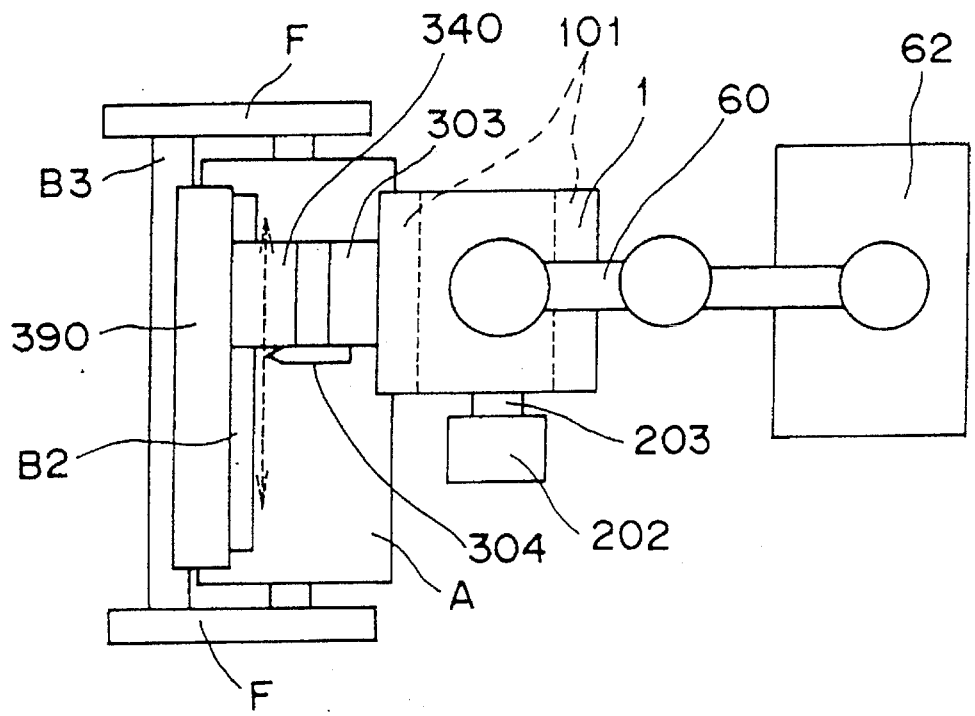
FIG. 27 is a top view of FIG. 26.

The wiper holder means 202 for wiping the intaglio roll is that described in the above second embodiment, and as shown in FIG. 27, is mounted to the hand body 1 or the wiper holder body 320 via the repulsion-pressing means 203.

The printing device of the thin-film forming device in the present embodiment is similarly operated as those of the first and the second embodiments described above, and therefore the explanation thereof is omitted.

The thin-film forming method according to the third embodiment is described below.

First, at the doctor blade automatic wiping device, the doctor blade B2 to which unnecessary ink is adhered is wiped by the wiper 308 to remove the unnecessary ink automatically.

The doctor blade B2 is a plate-shaped body, and to the tip 370 of one end thereof and to the upper face and the lower face close to the tip 370, the ink is adhered. The doctor blade B2 is held by a pair of blade holder means 309 composed of a upper blade holder 390 and a lower blade holder 391.

First, the wiper 308 is held by the wiper holder means 302 composed of the upper chuck 340 and the lower chuck 350 of the doctor blade automatic wiping device.

Namely, preferably, the rod 361 is advanced from the air cylinder 323, thus parting adequately the lower portion 346 of the upper chuck 340 and the lower portion 355 of the lower chuck 350 from each other, and the wiper 308 is held in a U-shaped section between the lower portion 346 of the upper chuck 340 and the lower portion 355 of the lower chuck 350 (see FIG. 28).

Then, by driving the arms 60 of the articulated robot 6, the wiper holder means 302 is moved to a predetermined position of the doctor blade B2, and at least one tip of the upper chuck 340 or the lower chuck 350 is pressed against at least one tip of the upper blade holder 390 or the lower blade holder 391 (see FIG. 28).

The driving of the arms 60 may be done by properly bending/stretching the arms 60 via the joints 61 of the articulated robot 6 or by vertically moving the robot base 62.

The tip of the doctor blade B2 is brought into contact with the wiper 308 always with a predetermined contact pressure while keeping the state that the tip of the chuck is pressed against the tip of the blade holder.

The predetermined contact pressure means such a pressure that the wiper 308 is brought into contact with the tip of the doctor blade B2 so as not to be parted from each other or so as not to contact too strong to break the wiper.

Then, the doctor blade B2 is held by the wiper 308 with a predetermined holding pressure by the upper chuck 340 and the lower chuck 350, by means of the force to pull the upper chuck 340 and the lower chuck 350 to each other to close each other by the holding force-generating means 322 (see FIG. 28).

Namely, when the rod 361 is retreated toward the air cylinder body 323, since a pulling force to pull the upper chuck 340 and the lower chuck 350 to each other to close to each other is always applied to the upper chuck 340 and the lower chuck 350 by the spring 360, the lower portion 346 of the upper chuck 340 and the lower portion 355 of the lower chuck 350 which hold the wiper 308 come close to each other to hold the doctor blade B2 with a predetermined holding pressure. The predetermined holding pressure means such a pressure when the upper face and the lower face of the doctor blade B2 is held by the wiper 308 that the solvent saturated into the wiper 308 sufficiently dissolves the unnecessary ink which has adhered to the doctor blade B2 and the dissolved ink is completely wiped out by the wiper 308.

Then, the rod 361 is retreated toward the air cylinder body 323 from the state that the doctor blade B2 is held with a predetermined holding pressure, and while keeping the state that the decreased gap between the upper chuck 340 and the lower chuck 350 are maintained, the chuck means 321 is made in a free state that it can move in a proper direction by an external force, and then can slidably move vertically relative to the wiper holder body 320.

Then, by driving the arms 60 of the articulated robot 6, the hand 305 is moved along the longitudinal direction of the doctor blade B2 (see FIG. 27).

Namely, as described above, while at least one tip of the upper chuck 340 and the lower chuck 350 is pressed against at least one tip of the upper blade holder 390 and the lower blade holder 391 and keeping the free state that the chuck means 321 can slide vertically, the chuck means 321 is moved reciprocatingly for required numbers along the longitudinal direction of the doctor blade B2. Since the chuck means 321 is in the free state, even if the hand 305 shifts vertically relative to the doctor blade B2 during the movement of the hand 305, the chuck means 321 can slide vertically by the shifted amount to hold the doctor blade B2 in the predetermined positional relationship.

Then, by driving the arms 60 of the articulated robot 6, the wiper 308 is parted from the doctor blade B2 to complete the wiping of the doctor blade B2.

Now, the automatic drying method after wiping the doctor blade B2 will be described.

First, the wiper 308 is dismounted from the chuck means 321 to increase the gap between the lower face of the lower portion 346 of the upper chuck 340 and the upper face of the lower portion 355 of the lower chuck 350, and the lower face of the lower portion 346 of the upper chuck 340 is opposed to the upper face of the doctor blade B2, and the upper face of the lower portion 355 of the lower chuck 350 is opposed to the upper face of the doctor blade B2. The gas for drying the doctor blade is ejected from the gas-ejecting holes 343, 353 on the lower face of the lower portion 345 of the upper chuck 340 and on upper face of the lower portion 355 of the lower chuck 350.

Then, by driving the articulated robot 6 while ejecting the gas, the hand 305 is moved along the longitudinal direction of the doctor blade B2.

The driving of the arms 60 may be done by properly bending/stretching the arms 60 via the joints 61 of the articulated robot 6 or by vertically moving the robot base 62.

After the doctor blade B2 is wiped/dried, a thin-film is formed on a to-be-printed material by the printing device. This forming method is similar to those of the first and the second embodiments described above, and then the explanation thereof has been omitted.

The thin-film forming apparatus and the thin-film forming method of the present invention have the effects described below by means of the above-mentioned structure and actions:

(1) Since operators do not have to go in and out in order to wipe out the doctor blade, dust is reduced and the cleanliness of the area can be improved. Furthermore, since the wiper is held automatically by the hand of the articulated robot, dust and dirt do not attach to the doctor blade. Accordingly, the doctor blade does not got dirty at all, as well as saving time and trouble, and thus, the wiping efficiency and the thin-film forming efficiency can be improved.

(2) Dust, dirt, and oils are not mixed in the ink. Therefore, for example, in the case of forming a macromolecular thin-film pattern such as a liquid crystal orientation film, the desired insulating property and orientation performance can be obtained in a thin-film, and then a thin-film having such high functions can be stably obtained.

(3) The doctor blade is wiped by pressing the wiper thereto by means of the repulsion-pressing means of the hand mounted to the arm of the articulated robot.

Therefore, the wiper can be pressed against the tip of the doctor blade always with a predetermined contact pressure. And, while keeping the predetermined contact pressure sure, the wiper can be moved automatically and easily in the longitudinal direction of the doctor blade. As a result, the tip of the doctor blade and the wiper are not parted from each other, and the tip of the doctor blade can be wiped out neatly and the wiping efficiency and the printing efficiency can be improved. Furthermore, it is prevented that the tip of the doctor blade and the wiper contact too strong to break the wiper or that the operator's hand is rubbed against the tip of the doctor blade to get injured, and thus, the high safety can be obtained.

(4) Since the operators do not go in and out in order to wipe the doctor blade and the doctor blade is automatically and correctly wiped out by the hand of the articulated robot, even if a plastic doctor blade is used, it is prevented that hard material hits the tip of the doctor blade erroneously. Accordingly, since the tip of the doctor blade is not made uneven by being chipped or depressed, no uneven scraping-off of unnecessary ink is caused, and the ink can be uniformly filled into all the ink cells of the intaglio roll and the ink amount can be measured.

(5) Since the wiper is held by the wiper holder means of the hand mounted to the arm of the articulated robot and the doctor blade is wiped automatically while being held by the wiper by means of the holding force-generating means of the wiper holder means, the doctor blade can be always held by the wiper with a predetermined holding pressure. Also, while maintaining the predetermined holding pressure, the wiper can be automatically moved in the longitudinal direction of the doctor blade, thereby the doctor blade can be wiped uniformly. Accordingly, the ink can be uniformly filled into the ink cells and the ink amount can be measured, and as a result, there is not caused any unevenness in the transferred amount of the ink to the printing roll to make the film thickness uniform. For example, when a macromolecular thin-film pattern such as a liquid crystal orientation film is formed, such a thin-film having the high functions that causes no unevenness in the display can be stably obtained.

(6) Since the gas for drying the doctor blade is ejected automatically to the surface of the doctor blade with the hand mounted to the articulated robot, it can be automatically and easily done to make the distance between the gas-ejecting means and the doctor blade a predetermined distance, and to maintain the predetermined distance while moving the gas-ejecting means in the longitudinal direction of the doctor blade. Therefore, the surface of the doctor blade can be dried uniformly, and the subsequent printing process can be smoothly carried out to improve the efficiency of the thin-film forming.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A thin-film forming apparatus which includes a printing device having an intaglio roll having a plurality of ink cells, an ink supply means which includes a doctor blade and which fills ink into the ink cells, a printing roll with an elastic plate to which the ink of the intaglio roll is transferred wound around a barrel surface thereof, and a printing table which fixes a to-be-printed material to which the ink of the printing roll is transferred, comprising:

an articulated robot; and an implementation means for printing preparatory works which is mounted to an arm of the articulated robot and which performs at least one operation among a mounting/dismounting operation of the elastic plate to/from the printing roll, an operation to wipe the barrel surface of the intaglio roll, and an operation to wipe the doctor blade;

wherein the implementation means for the printing preparatory works is an elastic plate automatic mounting/dismounting device which includes a fixed chuck means which is fixed at one end on a lower side of a hand body of a hand mounted to a tip of the arm of the articulated robot and which mountably and dismountably holds one end of the elastic plate, a stretching chuck means which is movably arranged at the other end of the lower side of the hand body opposite to the fixed chuck means and mountably and dismountably holds the other end of the elastic plate, and an elastic plate tension adjusting means which is fixed on the lower side of the hand body, and supports the stretching chuck means, and adjusts a distance between the fixed chuck means and the stretching chuck means, and the articulated robot has a control device which controls an operation of the elastic plate automatic mounting/dismounting device.

2. The thin-film forming apparatus according to claim 1, wherein the hand body has a mounting means which is movably mounted in parallel to the lower face of the hand body;

the elastic plate tension-adjusting means is an air cylinder fixed on a back face of the mounting means, and the stretching chuck means has a bearing body which is supported at a tip of a rod of the air cylinder, and a chuck body which is mounted to the bearing body rotatably in a horizontal direction against a lower face of the bearing body.

3. A thin-film forming apparatus which includes a printing device having an intaglio roll having a plurality of ink cells, an ink supply means which includes a doctor blade and which fills ink into the ink cells, a printing roll with an elastic plate to which the ink of the intaglio roll is transferred wound around a barrel surface thereof, and a printing table which fixes a to-be-printed material to which the ink of the printing roll is transferred, comprising:

an articulated robot; and an implementation means for printing preparatory works which is mounted to an arm of the articulated robot and which performs at least one operation among a mounting/dismounting operation of the elastic plate to/from the printing roll, an operation to wipe the barrel surface of the intaglio roll, and an operation to wipe the doctor blade;

wherein the implementation means for the printing preparatory works is an intaglio roll automatic wiping device which includes a wiper which wipes the barrel surface of the intaglio roll, a wiper holder means which holds the wiper, and a pressing means which presses the wiper, and which is mounted at one end of the hand body of the hand mounted at a tip of the arm of the articulated robot and is held by the wiper holder means, to the barrel surface of the intaglio roll; and the articulated robot has a control device which controls an operation of the intaglio roll automatic wiping device.

4. The thin-film forming apparatus according to claim 3, wherein the intaglio roll automatic wiping device also includes a gas-ejecting means for drying the intaglio roll.

5. The thin-film forming apparatus according to claim 3, wherein the pressing means includes a bearing body which is provided at a joint portion with the wiper holder means and supports the wiper holder means rotatably with respect to the wiper holder means which moves with movement of the arm of the articulated robot, a mounting body whose one end is mounted to the hand body, and a pushing force generating member which is provided at the other end of the mounting body and pushes the bearing body toward the intaglio roll with respect to the mounting body.

6. The thin-film forming apparatus according to claim 4, wherein the pressing means includes a bearing body which is provided at a joint portion with the wiper holder means and supports the wiper holder means rotatably with respect to the wiper holder means which moves with movement of the arm of the articulated robot, a mounting body whose one end is mounted to the hand body, and a pushing force generating member which is provided at the other end of the mounting body and pushes the bearing body toward the intaglio roll with respect to the mounting body.

7. A thin-film forming apparatus which includes a printing device having an intaglio roll having a plurality of ink cells, an ink supply means which includes a doctor blade and which fills ink into the ink cells, a printing roll with an elastic plate to which the ink of the intaglio roll is transferred wound around a barrel surface thereof, and a printing table which fixes a to-be-printed material to which the ink of the printing roll is transferred, comprising:

an articulated robot; and an implementation means for printing preparatory works which is mounted to an arm of the articulated robot and which performs at least one operation among a mounting/dismounting operation of the elastic plate to/from the printing roll, an operation to wipe the barrel surface of the intaglio roll, and an operation to wipe the doctor blade;

wherein the implementation means for the printing preparatory works is a doctor blade automatic wiping device which includes a wiper which wipes the doctor blade, a wiper holder means to which the wiper is mounted and which holds the doctor blade therebetween via the wiper, and a pressing means which is mounted at one end of a hand body of a hand mounted at a tip of the arm of the articulated robot and presses the wiper holder means toward the doctor blade, and the articulated robot has a control device which controls an operation of the doctor blade automatic wiping device.

8. The thin-film forming apparatus according to claim 7, wherein the doctor blade automatic wiping device also includes a gas-ejecting means for drying the doctor blade.

9. The thin-film forming apparatus according to claim 7, wherein the wiper holder means includes a wiper holder body mounted to the pressing means, a chuck means having an upper chuck and a lower chuck which is slidably mounted against the wiper holder body, holds the wiper, and carries out a chuck opening/closing operation for the doctor blade, a holding force generating means which is mounted to the chuck means and generates an elastic force for holding the doctor blade by the chuck means, and driving means which are mounted to the wiper holder body and drive the chuck means in a direction to release hold of the doctor blade by the chuck means.

10. The thin-film forming apparatus according to claim 8, wherein the wiper holder means includes a wiper holder body mounted to the pressing means, a chuck means having an upper chuck and a lower chuck which is slidably mounted against the wiper holder body, holds the wiper, and carries out a chuck opening/closing operation for the doctor blade, a holding force generating means which is mounted to the chuck means and generates an elastic force for holding the doctor blade by the chuck means, and driving means which are mounted to the wiper holder body and drive the chuck means in a direction to release hold of the doctor blade by the chuck means.

11. A thin-film forming apparatus which includes a printing device having an intaglio roll having a plurality of ink cells, an ink supply means which includes a doctor blade and which fills ink into the ink cells, a printing roll with an elastic plate to which the ink of the intaglio roll is transferred wound around a barrel surface thereof, and a printing table which fixes a to-be-printed material to which the ink of the printing roll is transferred, comprising:

an articulated robot; and an implementation means for printing preparatory works which is mounted to an arm of the articulated robot and which performs at least one operation among a mounting/dismounting operation of the elastic plate to/from the printing roll, an operation to wipe the barrel surface of the intaglio roll, and an operation to wipe the doctor blade;

wherein the implementation means for the printing preparatory works comprises:

an elastic plate automatic mounting/dismounting device which includes a fixed chuck means which is fixed at one end on a lower side of a hand body of a hand mounted to a tip of the arm of the articulated robot and mountably and dismountably holds one end of the elastic plate, a stretching chuck means which is movably arranged at the other end on the lower side of the and body opposite to the fixed chuck means and mountably dismountably holds the other end of the elastic plate, and an elastic plate tension-adjusting means which is fixed on the lower side of the hand body, and supports the stretching chuck means, and adjusts a distance between the fixed chuck means and the stretching chuck means;

an intaglio roll automatic wiping device which includes a wiper which wipes the barrel surface of the intaglio roll, a wiper holder means which holds the wiper, and a pressing means which presses the wiper, which is mounted at one end of a hand body of a hand mounted at a tip of the arm of the articulated robot and is held by the wiper holder means, to the barrel surface of the intaglio roll;

a doctor blade automatic wiping device which includes a wiper which wipes the doctor blade, a wiper holder means to which the wiper is mounted and which holds the doctor blade therebetween via the wiper, and a pressing means which is mounted at one end of a hand body of a hand mounted to the tip of the arm of the articulated robot and pushes the wiper holder means toward the doctor blade, and a control device which is provided to the articulated robot and controls operations of the elastic plate automatic mounting/dismounting device, the intaglio roll automatic wiping device, and the doctor blade automatic wiping device.

12. A thin-film forming method which performs a thin-film printing by using thin-film forming apparatus which comprises a printing device having an intaglio roll having a plurality of ink cells, an ink supply means which has a doctor blade and which fills ink into the ink cells, a printing roll with an elastic plate to which the ink of the intaglio roll is transferred wound round a barrel surface thereof, and a printing table which fixes a to-be-printed material to which the ink of the printing roll is transferred, a articulated robot, and an implementation means for printing preparatory works which is mounted to an arm of the articulated robot, and winding the elastic plate round the barrel surface of the printing roll, and filling the ink into the ink cells of the intaglio roll, and then transferring the ink from the intaglio roll to the elastic plate in the printing roll, and transferring the ink from the printing roll to the to-be-printed material which is fixed to the printing table;

which includes an implementation process for the printing preparatory works which performs at least one process of a mounting dismounting process of the elastic plate to/from the printing roll, a wiping process of the barrel surface of the intaglio roll, and a wiping process of the doctor blade, by driving the implementation means for the printing preparatory works by means of the articulated robot;

wherein the implementation process for the printing preparatory works is implemented by using the thin-film forming apparatus which comprises an elastic plate automatic mounting/dismounting device which includes a fixed chuck means which is fixed at one end on a lower side of a hand body of a hand mounted to a tip of the arm of the articulated robot and mountable and dismountably holds one end of the elastic plate, a stretching chuck means which is movably arranged at the other end on the lower side of the hand body opposite to the fixed chuck means and mountable and dismountably holds the other end of the elastic plate, and an elastic plate tension-adjusting means which is fixed on the lower side of the hand body, and supports the stretching chuck means, and adjusts a distance between the fixed chuck means and the stretching chuck means, and a control device which is provided to the articulated robot and controls an operation of the elastic plate automatic mounting/dismounting device, the implementation process comprising:

a first process in which a position of the first chuck means of the barrel of the printing roll and a position of the first elastic plate holder of the elastic plate are adjusted by holding a first elastic plate holder and a second elastic plate holder of the elastic plate which is in a slackened state by the fixed chuck means and the stretching chuck means of the elastic plate automatic mounting/dismounting device, respectively and driving the arm of the articulated robot, and then the first elastic plate holder of the elastic plate is transferred from the fixed chuck means of the hand to the first chuck means of the barrel of the printing roll;

a second process in which the elastic plate is wound round the barrel surface of the printing roll, while maintaining such a state that a predetermined tension is applied to the elastic plate, by driving the tension-adjusting means, the arm of the articulated robot, and the barrel of the printing roll in a direction to wind the elastic plate; and a third process in which the second elastic plate holder of the elastic plate is moved to a position where the second chuck means of the barrel of the printing roll is provided, and then the second elastic plate holder of the elastic plate is transferred from the stretching means of the hand to the second chuck means of the barrel of the printing roll to complete a mounting of the elastic plate to the barrel surface of the printing roll.

13. The thin-film forming method according to claim 12, wherein the second process is to bring the hand gradually close to the barrel of the printing roll with a rotation of the barrel of the printing roll, by driving the arm of the articulated robot while applying a predetermined tension to the elastic plate between the first elastic plate holder and the second elastic plate holder, then maintaining a state that the predetermined tension is applied to the elastic plate by moving back and forth a rod from an air cylinder of the elastic plate tension-adjusting means, and adjusting a pulling direction of the elastic plate by rotating the elastic plate tension-adjusting means or the stretching chuck means.

14. The thin-film forming method according to claim 12, wherein a dismounting the elastic plate from the barrel of the printing roll is completed by transferring the second elastic plate holder of the elastic plate from the second chuck means of the barrel of the printing roll to which the elastic plate is wound, to the stretching chuck means of the hand, then, rotating the barrel of the printing roll in a direction that the elastic plate comes off, driving the arm of the articulated robot to adjust positions of the fixed chuck means of the hand and the first elastic plate holder of the elastic plate, and then transferring the first elastic plate holder of the elastic plate from the first chuck means of the barrel of the printing roll to the fixed chuck means of the hand.

15. The thin-film forming method according to claim 13, wherein a dismounting the elastic plate from the barrel of the printing roll is completed by transferring the second elastic plate holder of the elastic plate from the second chuck means of the barrel of the printing roll to which the elastic plate is wound, to the stretching chuck means of the hand, then, rotating the barrel of the printing roll in a direction that the elastic plate comes off, driving the arm of the articulated robot to adjust positions of the fixed chuck means of the hand and the first elastic plate holder of the elastic plate, and then transferring the first elastic plate holder of the elastic plate from the first chuck means of the barrel of the printing roll to the fixed chuck means of the hand.

16. A thin-film forming method which performs a thin-film printing by using thin-film forming apparatus which comprises a printing device having an intaglio roll having a plurality of ink cells, an ink supply means which has a doctor blade and which fills ink into the ink cells, a printing roll with an elastic plate to which the ink of the intaglio roll is transferred wound round a barrel surface thereof, and a printing table which a to-be-printed material to which the ink of the printing roll is transferred, a articulated robot, and an implementation means for printing preparatory works which is mounted to an arm of the articulated robot, and winding the elastic plate round the barrel surface of the printing roll, and filling the ink into the ink cells of the intaglio roll, and then transfer-ring the ink from the intaglio roll to the elastic plate in the printing roll, and transferring the ink from the printing roll to the to-be-printed material which is fixed to the printing table;

which includes an implementation process for the printing preparatory works which performs at least one process of a mounting dismounting process of the elastic plate to/from the printing roll, a wiping process of the barrel surface of the intaglio roll, and a wiping process of the doctor blade, by driving the implementation means for the printing preparatory works by means of the articulated robot;

wherein the implementation process for the printing is preparatory works is implemented by using the thin-film forming apparatus which comprises an intaglio roll automatic wiping device which includes a wiper for wiping the barrel surface of the intaglio roll, a wiper holder means for holding the wiper, and a pressing means which is mounted to one end of a hand body of a hand mounted to a tip of the arm of the articulated robot and presses the wiper held by the wiper holder means against the barrel surface of the intaglio roll, and a control device which is provided to the articulated robot and controls an operation of the intaglio roll automatic wiping device, and the process includes holding the wiper by the wiper holder means of the intaglio roll automatic wiping device, moving the wiper holder means by driving the arm of the articulated robot, pressing the wiper to the barrel surface of the intaglio roll by the pressing means with a predetermined contact pressure, then, rotating the intaglio roll, maintaining the contact pressure of the wiper against the barrel surface of the intaglio roll moving the hand in an axial direction of the intaglio roll to carry out wiping and parting the wiper from the barrel surface of the intaglio roll by driving the arm of the articulated robot.

17. The thin-film forming method according to claim 16, wherein while rotating the intaglio roll after pressing the wiper with a predetermined contact pressure against the barrel surface of the intaglio roll and while maintaining the contact pressure of the wiper against the barrel surface of the intaglio roll to make the wiper holder means rotatable, the hand is moved along the axial direction of the intaglio roll by driving the arm of the articulated robot.

18. The thin-film forming method according to claim 16, wherein a gas-ejecting means as well as the hand are moved along the axial direction of the intaglio roll by driving the arm of the articulated robot while rotating the intaglio roll and ejecting gas from the gas-ejecting means for drying the intaglio roll.

19. The thin-film forming method according to claim 17, wherein a gas-ejecting means as well as the hand are moved along the axial direction of the intaglio roll by driving the arm of the articulated robot while rotating the intaglio roll and ejecting gas from the gas-ejecting means for drying the intaglio roll.

20. A thin-film forming method which performs a thin-film printing by using thin-film forming apparatus which comprises a printing device having an intaglio roll having a plurality of ink cells, an ink supply means which has a doctor blade and which fills ink into the ink cells, a printing roll with an elastic plate to which the ink of the intaglio roll is transferred wound round a barrel surface thereof, and a printing table which fixes a to-be-printed material to which the ink of the printing roll is transferred, a articulated robot, and an implementation means for printing preparatory works which is mounted to an arm of the articulated robot, and winding the elastic plate round the barrel surface of the printing roll, and filling the ink into the ink cells of the intaglio roll, and then transfer-ring the ink from the intaglio roll to the elastic plate in the printing roll, and transferring the ink from the printing roll to the to-be-printed material which is fixed to the printing table;

which includes an implementation process for the printing preparatory works which performs at least one process of a mounting dismounting process of the elastic plate to/from the printing roll, a wiping process of the barrel surface of the intaglio roll, and a wiping process of the doctor blade, by driving the implementation means for the printing preparatory works by means of the articulated robot;

wherein the implementation process for the printing preparatory works is implemented by using the thin-film forming apparatus which comprises a doctor blade automatic wiping device which includes a wiper for wiping the doctor blade, a wiper holder means to which the wiper is mounted and which holds the doctor blade therebetween via the wiper, and a pressing means which is mounted to one end of a hand body of a hand mounted to a tip of the arm of the articulated robot and presses the wiper holder means toward the doctor blade, and a control device which is provided to the articulated robot and controls an operation of the doctor blade automatic wiping device, the wiper holder means including a wiper holder body mounted to the pressing means, a chuck means having the upper chuck and a lower chuck, which is mounted slidably against the wiper holder body, holds the wiper, and performs chuck opening/closing operation for the doctor blade, a holding force generating means which is mounted to the chuck means and generates an elastic force for holding the doctor blade by the chuck means, and driving means which is mounted to the wiper holder body and drives the chuck means in a direction that holding of the doctor blade by the chuck means is released; and the process includes moving the wiper holder means to a predetermined position of the doctor blade by driving the arm of the articulated robot, pushing at least one tip of the upper chuck or the lower chuck of the chuck means provided to the wiper holder means against at least one tip of an upper blade holder or a lower blade holder, holding the doctor blade by the wiper by means of the holding force-generating means, then, wiping the doctor blade by moving the hand along a longitudinal direction of the doctor blade by driving the arm of the articulated robot, and then parting the wiper from the doctor blade by driving the arm of the articulated robot.

21. The thin-film forming method according to claim 20, wherein a gas-ejecting means as well as the hand are moved along the longitudinal direction of the doctor blade by driving the arm of the articulated robot while ejecting gas from the gas-ejecting means.

* * * * *